US011223532B2

(12) United States Patent
Sun et al.

(10) Patent No.: US 11,223,532 B2
(45) Date of Patent: Jan. 11, 2022

(54) SUBBAND USAGE DEPENDENT DOWNLINK SIGNALS AND CHANNELS

(71) Applicant: QUALCOMM Incorporated, San Diego, CA (US)

(72) Inventors: Jing Sun, San Diego, CA (US); Huilin Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/592,709

(22) Filed: Oct. 3, 2019

(65) Prior Publication Data

US 2020/0112484 A1 Apr. 9, 2020

Related U.S. Application Data

(60) Provisional application No. 62/742,255, filed on Oct. 5, 2018.

(51) Int. Cl.
*H04L 12/24* (2006.01)
*H04W 72/04* (2009.01)
(Continued)

(52) U.S. Cl.
CPC .......... *H04L 41/0896* (2013.01); *H04L 1/001* (2013.01); *H04L 1/0038* (2013.01);
(Continued)

(58) Field of Classification Search
CPC ... H04L 41/0896; H04L 1/001; H04L 1/0038; H04L 5/0094; H04L 5/0007; H04L 5/001;
(Continued)

(56) References Cited

U.S. PATENT DOCUMENTS

2015/0382372 A1* 12/2015 Vajapeyam ........... H04W 76/28
370/329
2019/0215900 A1* 7/2019 Pan ....................... H04W 76/38
(Continued)

OTHER PUBLICATIONS

Huawei, et al., "BWP Operation in NR Unlicensed Band", 3GPP TSG RAN WG1 Meeting #94, 3GPP Draft; R1-1808065, 3rd Generation Partnership Project (3gpp), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 10, 2018 (Aug. 10, 2018), 4 Pages, XP051515469, Retrieved from the Internet: URL: http://www.3gpp.org/ftp/tsg%5Fran/WG1%5FRL1/TSGR1%5F94/Docs/R1%2D1808065%2Ezip [retrieved on AUg. 10, 2018] Section 2.3.
(Continued)

*Primary Examiner* — Harry H Kim
(74) *Attorney, Agent, or Firm* — Holland & Hart LLP

(57) ABSTRACT

Methods, systems, and devices for wireless communications are described. A bandwidth part (BWP) configuration may be identified for a user equipment (UE), where the BWP configuration is part of a shared radio frequency spectrum band. In some cases, a base station may transmit a resource configuration for the BWP to the UE that indicates a set of subbands for the BWP and an indication of which subbands are available for the resource contention and possible subsequent communications. The UE and base station may determine a set of time-frequency resources for at least one downlink signal to be transmitted from the base station to the UE based on the BWP and available subbands. In some cases, the resource configurations for the BWP may include a reference signal configuration, a semi-persistent scheduling configuration, a control resource set configuration, or a combination thereof for the available subbands of the BWP.

30 Claims, 19 Drawing Sheets

(51) Int. Cl.
*H04W 72/12* (2009.01)
*H04L 1/00* (2006.01)
*H04W 72/08* (2009.01)
*H04W 28/06* (2009.01)
*H04L 5/00* (2006.01)

(52) U.S. Cl.
CPC ....... *H04W 28/06* (2013.01); *H04W 72/0406* (2013.01); *H04W 72/08* (2013.01); *H04W 72/12* (2013.01); *H04W 72/044* (2013.01)

(58) Field of Classification Search
CPC .. H04L 5/003; H04W 72/0406; H04W 72/12; H04W 72/08; H04W 28/06; H04W 72/044; H04W 72/0453
See application file for complete search history.

(56) References Cited

U.S. PATENT DOCUMENTS

| | | | | |
|---|---|---|---|---|
| 2020/0021999 | A1* | 1/2020 | Park | H04L 1/1854 |
| 2020/0068546 | A1* | 2/2020 | Wu | H04W 16/14 |
| 2020/0092864 | A1* | 3/2020 | Chen | H04W 72/042 |
| 2020/0112976 | A1* | 4/2020 | Lin | H04W 72/042 |
| 2020/0235894 | A1* | 7/2020 | Takeda | H04L 5/0092 |
| 2020/0236699 | A1* | 7/2020 | Nakashima | H04L 27/26 |

OTHER PUBLICATIONS

Huawei, et al., "Numerology and Wideband Operation in NR Unlicensed", 3GPP TSG RAN WG1 Meeting #92bis, 3GPP Draft; R1-1803677, 3rd Generation Partnership Project (3GPP), Mobile Competence Centre; 650, Route Des Lucioles; F-06921 Sophia-Antipolis Cedex; France, vol. RAN WG1, No. Sanya, China; Apr. 16, 2018-Apr. 20, 2018, Apr. 6, 2018, 8 Pages, XP051412955, Retrieved from the Internet: URL: http://www.3gpp.org/ftp/tsg%5Fran/WG1%5FRL1/TSGR1%5F92b/Docs/ [retrieved on Apr. 6, 2018] section 3.2.

International Search Report and Written Opinion—PCT/US2019/054827—ISA/EPO—dated Jan. 17, 2020.

Nokia, et al., "On the Frame Structure and Wideband Operation for NR-U", 3GPP TSG RAN WG1 Meeting #94bis, 3GPP Draft; R1-1810613_Frame Structure and WB Operation, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018 (Sep. 28, 2018), 13 Pages, XP051518019, Retrieved from the Internet: URL: http://www.3gpp.org/ftp/tsg%5Fran/WG1%5FRL1/TSGR1%5F94b/Docs/R1%2D1810613%2Ezip [retrieved on Sep. 28, 2018] See section 4.2.3.

Qualcomm Incorporated: "DL Signals and Channels for NR-U", 3GPP TSG RAN WG1 Meeting #84bis, 3GPP Draft; R1-1811250 7.2.2.3.1 DL Signals and Channels for NR-U, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 29, 2018 (Sep. 29, 2018), 9 Pages, XP051518653, Retrieved from the Internet: URL: http://www.3gpp.org/ftp/tsg%5Fran/WG1%5FRL1/TSGR1%5F94b/Docs/R1%2D1811250%2Ezip [retrieved on Sep. 29, 2018] Section 5.

TCL Communication: "Wideband Carrier Usage for NR-U", 3GPP TSG RAN WG1 Meeting #94bis, 3GPP Draft; R1-1811084_Wideband_Operation_for_NR-U_TCL_Final, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 28, 2018 (Sep. 28, 2018), 4 Pages, XP051518485, Retrieved from the Internet: URL: http://www.3gpp.org/ftp/tsg%5Fran/WG1%5FRL1/TSGR1%5F94b/Docs/R1%2D1811084%2Ezip [retrieved on Sep. 28, 2018] Section 2.

* cited by examiner

SUBBAND USAGE DEPENDENT DOWNLINK SIGNALS AND CHANNELS

CROSS REFERENCE

The present application for patent claims the benefit of U.S. Provisional Patent Application No. 62/742,255 by SUN et al., entitled "SUBBAND USAGE DEPENDENT DOWNLINK SIGNALS AND CHANNELS," filed Oct. 5, 2018, assigned to the assignee hereof, and which is expressly incorporated by reference herein.

BACKGROUND

The following relates generally to wireless communications, and more specifically to subband usage dependent downlink signals and channels.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a wideband bandwidth part (BWP) may be configured for communications in the system, where the wideband BWP is divided into multiple subbands. The wideband BWP and corresponding subbands may be part of a shared (e.g., unlicensed or shared licensed) radio frequency (RF) spectrum for which one or more wireless devices (e.g., base stations and UEs) contend. A base station may determine which subbands are available for communications with other wireless devices based on a listen-before-talk (LBT) procedure that indicates if on-going communications are present on each of the subbands. The base station may indicate which subbands are available in a downlink message to one or more UEs. Additionally, the base station may transmit configuration information (e.g., resource allocations for reference signals, control information, etc.) for a UE to receive subsequent downlink transmissions. However, there may be too many combinations of configurations for each subband based on different characteristics of each subband. Efficient techniques are desired for communicating on one or more subbands of a wideband BWP.

SUMMARY

The described techniques relate to improved methods, systems, devices, and apparatuses that support subband usage dependent downlink signals and channels. Generally, the described techniques provide for identifying a bandwidth part (BWP) configuration for a user equipment (UE), where the BWP configuration indicates a set of frequency resources of a shared radio frequency (RF) spectrum band. In some cases, a base station may transmit to the UE a resource configuration for the BWP that indicates a set of subbands for the BWP. If the UE is contending for resources to communicate with the base station (e.g., in an unlicensed or shared licensed communications system), the base station may further transmit, during a transmission opportunity (TxOP), an indication of which subbands are available for the resource contention and possible subsequent communications for the TxOP. The base station may determine the available subbands by performing a listen-before-talk (LBT) procedure. The UE and base station may determine a set of time-frequency resources for at least one downlink signal to be transmitted from the base station to the UE based on the BWP and available subbands. Accordingly, the UE may receive the downlink signal on the set of time-frequency resources from the base station. In some cases, the resource configurations for the BWP may include a reference signal configuration (e.g., channel state information reference signal (CSI-RS)), a semi-persistent scheduling (SPS) configuration (e.g., downlink SPS) for data transmissions, a control resource set (CORESET) configuration, or a combination thereof. The UE and base station may determine which resources are allocated for each resource configuration based on the respective configurations and the available subbands.

A method of wireless communication at a UE is described. The method may include identifying a BWP configuration for the UE, the BWP configuration indicating a set of frequency resources of a shared RF spectrum band, receiving a resource configuration for the BWP, the resource configuration indicating a set of subbands for the BWP and time-frequency resources to be used by the UE to receive at least one downlink signal, receiving, during a TxOP, an indication of at least one available subband of the set of subbands for the TxOP, the at least one available subband including a subset of the frequency resources, determining, based on the received resource configuration for the BWP and the received indication of the at least one available subband, a set of time-frequency resources of the at least one available subband for the at least one downlink signal, and receiving, during the TxOP, the at least one downlink signal according to the determined set of time-frequency resources.

An apparatus for wireless communication at a UE is described. The apparatus may include a processor, memory coupled with the processor, and instructions stored in the memory. The instructions may be executable by the processor to cause the apparatus to identify a BWP configuration for the UE, the BWP configuration indicating a set of frequency resources of a shared RF spectrum band, receive a resource configuration for the BWP, the resource configuration indicating a set of subbands for the BWP and time-frequency resources to be used by the UE to receive at least one downlink signal, receive, during a TxOP, an indication of at least one available subband of the set of subbands for the TxOP, the at least one available subband including a subset of the frequency resources, determine, based on the received resource configuration for the BWP and the received indication of the at least one available subband, a set of time-frequency resources of the at least one available subband for the at least one downlink signal, and receive, during the TxOP, the at least one downlink signal according to the determined set of time-frequency resources.

Another apparatus for wireless communication at a UE is described. The apparatus may include means for identifying a BWP configuration for the UE, the BWP configuration indicating a set of frequency resources of a shared RF spectrum band, receiving a resource configuration for the BWP, the resource configuration indicating a set of subbands for the BWP and time-frequency resources to be used by the UE to receive at least one downlink signal, receiving, during a TxOP, an indication of at least one available subband of the set of subbands for the TxOP, the at least one available subband including a subset of the frequency resources, determining, based on the received resource configuration for the BWP and the received indication of the at least one available subband, a set of time-frequency resources of the at least one available subband for the at least one downlink signal, and receiving, during the TxOP, the at least one downlink signal according to the determined set of time-frequency resources.

A non-transitory computer-readable medium storing code for wireless communication at a UE is described. The code may include instructions executable by a processor to identify a BWP configuration for the UE, the BWP configuration indicating a set of frequency resources of a shared RF spectrum band, receive a resource configuration for the BWP, the resource configuration indicating a set of subbands for the BWP and time-frequency resources to be used by the UE to receive at least one downlink signal, receive, during a TxOP, an indication of at least one available subband of the set of subbands for the TxOP, the at least one available subband including a subset of the frequency resources, determine, based on the received resource configuration for the BWP and the received indication of the at least one available subband, a set of time-frequency resources of the at least one available subband for the at least one downlink signal, and receive, during the TxOP, the at least one downlink signal according to the determined set of time-frequency resources.

In some examples of the method, apparatuses, and non-transitory computer-readable medium described herein, where the resource configuration includes a reference signal configuration for the BWP, and where determining the set of time-frequency resources of the at least one available subband may include operations, features, means, or instructions for determining, based on the received reference signal configuration and the received indication, resources of the at least one available subband to monitor for reference signals during the TxOP.

In some examples of the method, apparatuses, and non-transitory computer-readable medium described herein, where the resource configuration includes a SPS configuration for the BWP, and where determining the set of time-frequency resources of the at least one available subband may include operations, features, means, or instructions for determining, based on the received SPS configuration and the received indication, resources within the at least one available subband to use to receive downlink data during the TxOP.

In some examples of the method, apparatuses, and non-transitory computer-readable medium described herein, where the resource configuration includes a CORESET configuration for the BWP, and where determining the set of time-frequency resources of the at least one available subband may include operations, features, means, or instructions for determining, based on the received CORESET configuration and the received indication, a set of control channel candidates for the at least one available subband during the TxOP.

In some examples of the method, apparatuses, and non-transitory computer-readable medium described herein, determining the set of control channel candidates for the at least one available subband may include operations, features, means, or instructions for identifying, for the BWP, a set of control channel candidates indicated by the CORESET configuration and determining the set of control channel candidates based on at least one of the identified set of control channel candidates being within the at least one available subband.

In some examples of the method, apparatuses, and non-transitory computer-readable medium described herein, determining the set of control channel candidates further may include operations, features, means, or instructions for identifying a control channel candidate for which at least a portion may be outside the at least one available subband and dropping the identified control channel candidate.

In some examples of the method, apparatuses, and non-transitory computer-readable medium described herein, determining the set of control channel candidates for the at least one available subband may include operations, features, means, or instructions for identifying an intersection of a reference CORESET indicated by the received CORESET configuration and the indicated subband, determining the CORESET for the at least one available subband from the identified intersection and determining, based on the determined CORESET, the set of control channel candidates for the at least one available subband.

Some examples of the method, apparatuses, and non-transitory computer-readable medium described herein may further include operations, features, means, or instructions for attempting to decode, according to the determined set of control channel candidates, a control signal for the at least one available subband during the TxOP, the received at least one downlink signal including the control signal.

In some examples of the method, apparatuses, and non-transitory computer-readable medium described herein, attempting to decode the control signal may include operations, features, means, or instructions for identifying a set of search space (SS) sets for the at least one available subband, the set of SS sets including at least a first SS set and a second SS set, determining whether a first number of control channel candidates of the first SS set exceeds a blind decoding threshold, determining, based on the first SS set exceeding the blind decoding threshold, whether a second number of control channel candidates of the second SS set exceeds the blind decoding threshold and attempting to decode the control signal according to the second SS set based on the second SS set not exceeding the blind decoding threshold.

In some examples of the method, apparatuses, and non-transitory computer-readable medium described herein, attempting to decode the control signal may include operations, features, means, or instructions for identifying a set of SS sets for the at least one available subband, each of the set of SS sets associated with an index value, identifying an offset for a SS set of the set of SS sets based on the index value associated with the SS set and attempting to decode the control signal according to the SS set and the identified offset.

In some examples of the method, apparatuses, and non-transitory computer-readable medium described herein, attempting to decode the control signal may include operations, features, means, or instructions for attempting to decode the control signal according to one or more of a set of SS sets, at least one of the set of SS sets including a UE specific SS set.

In some examples of the method, apparatuses, and non-transitory computer-readable medium described herein, receiving the indication of the at least one available subband may include operations, features, means, or instructions for receiving, in the at least one available subband, a control channel conveying the indication of the at least one available subband.

In some examples of the method, apparatuses, and non-transitory computer-readable medium described herein, the control channel may be a common control channel shared by a set of UEs.

In some examples of the method, apparatuses, and non-transitory computer-readable medium described herein, determining the set of time-frequency resources of the at least one available subband for the at least one downlink signal may include operations, features, means, or instructions for identifying an intersection of the time-frequency resources indicated by the received resource configuration and the subset of the frequency resources and determining, based on the identified intersection, the set of time-frequency resources within the at least one available subband for the at least one downlink signal.

In some examples of the method, apparatuses, and non-transitory computer-readable medium described herein, the received resource configuration includes an SPS configuration, the SPS configuration indicating a first transport block size (TBS) different from a TBS associated with the at least one downlink signal received by the UE according to the determined set of time-frequency resources.

In some examples of the method, apparatuses, and non-transitory computer-readable medium described herein, the received resource configuration includes an SPS configuration, where the at least one downlink signal may be encoded using a same modulation and coding scheme (MCS) as indicated by the SPS configuration.

A method of wireless communication at a base station is described. The method may include identifying a BWP configuration for a UE, the BWP configuration indicating a set of frequency resources of a shared RF spectrum band, transmitting, to the UE, a resource configuration for the BWP, the resource configuration indicating a set of subbands for the BWP and time-frequency resources to be used by the UE to receive at least one downlink signal, transmitting, during a TxOP, an indication of at least one available subband of the set of subbands for the TxOP, the at least one available subband including a subset of the frequency resources, determining, based on the transmitted resource configuration for the BWP and the transmitted indication of the at least one available subband, a set of time-frequency resources of the at least one available subband for the at least one downlink signal, and transmitting, during the TxOP, the at least one downlink signal according to the determined set of time-frequency resources.

An apparatus for wireless communication at a base station is described. The apparatus may include a processor, memory coupled with the processor, and instructions stored in the memory. The instructions may be executable by the processor to cause the apparatus to identify a BWP configuration for a UE, the BWP configuration indicating a set of frequency resources of a shared RF spectrum band, transmit, to the UE, a resource configuration for the BWP, the resource configuration indicating a set of subbands for the BWP and time-frequency resources to be used by the UE to receive at least one downlink signal, transmit, during a TxOP, an indication of at least one available subband of the set of subbands for the TxOP, the at least one available subband including a subset of the frequency resources, determine, based on the transmitted resource configuration for the BWP and the transmitted indication of the at least one available subband, a set of time-frequency resources of the at least one available subband for the at least one downlink signal, and transmit, during the TxOP, the at least one downlink signal according to the determined set of time-frequency resources.

Another apparatus for wireless communication at a base station is described. The apparatus may include means for identifying a BWP configuration for a UE, the BWP configuration indicating a set of frequency resources of a shared RF spectrum band, transmitting, to the UE, a resource configuration for the BWP, the resource configuration indicating a set of subbands for the BWP and time-frequency resources to be used by the UE to receive at least one downlink signal, transmitting, during a TxOP, an indication of at least one available subband of the set of subbands for the TxOP, the at least one available subband including a subset of the frequency resources, determining, based on the transmitted resource configuration for the BWP and the transmitted indication of the at least one available subband, a set of time-frequency resources of the at least one available subband for the at least one downlink signal, and transmitting, during the TxOP, the at least one downlink signal according to the determined set of time-frequency resources.

A non-transitory computer-readable medium storing code for wireless communication at a base station is described. The code may include instructions executable by a processor to identify a BWP configuration for a UE, the BWP configuration indicating a set of frequency resources of a shared RF spectrum band, transmit, to the UE, a resource configuration for the BWP, the resource configuration indicating a set of subbands for the BWP and time-frequency resources to be used by the UE to receive at least one downlink signal, transmit, during a TxOP, an indication of at least one available subband of the set of subbands for the TxOP, the at least one available subband including a subset of the frequency resources, determine, based on the transmitted resource configuration for the BWP and the transmitted indication of the at least one available subband, a set of time-frequency resources of the at least one available subband for the at least one downlink signal, and transmit, during the TxOP, the at least one downlink signal according to the determined set of time-frequency resources.

In some examples of the method, apparatuses, and non-transitory computer-readable medium described herein, where the resource configuration includes a reference signal configuration for the BWP, and where determining the set of time-frequency resources of the at least one available subband may include operations, features, means, or instructions for determining, based on the transmitted reference signal configuration and the transmitted indication, resources of the at least one available subband to use to transmit reference signals during the TxOP.

In some examples of the method, apparatuses, and non-transitory computer-readable medium described herein, where the resource configuration includes a SPS configuration for the BWP, and where determining the set of time-frequency resources of the at least one available subband may include operations, features, means, or instructions for determining, based on the transmitted SPS configuration and the transmitted indication, resources within the at least one available subband to use to transmit downlink data for the UE during the TxOP.

In some examples of the method, apparatuses, and non-transitory computer-readable medium described herein, where the resource configuration includes a CORESET configuration for the BWP, and where determining the set of time-frequency resources of the at least one available subband may include operations, features, means, or instructions for determining, based on the transmitted CORESET configuration and the transmitted indication, a set of control channel candidates to be used by the UE for the at least one available subband during the TxOP.

In some examples of the method, apparatuses, and non-transitory computer-readable medium described herein, determining the set of control channel candidates for the at least one available subband may include operations, features, means, or instructions for identifying, for the BWP, a set of control channel candidates indicated by the CORESET configuration and determining the set of control channel candidates based on at least one of the identified set of control channel candidates being within the indicated available subband.

In some examples of the method, apparatuses, and non-transitory computer-readable medium described herein, determining the set of control channel candidates further may include operations, features, means, or instructions for identifying a control channel candidate for which at least a portion may be outside the at least one available subband and dropping the identified control channel candidate.

In some examples of the method, apparatuses, and non-transitory computer-readable medium described herein, determining the set of control channel candidates for the at least one available subband may include operations, features, means, or instructions for identifying an intersection of a reference CORESET indicated by the received CORESET configuration and the indicated subband, determining the CORESET for the at least one available subband from the identified intersection and determining, based on the determined CORESET, the set of control channel candidates for the at least one available subband.

In some examples of the method, apparatuses, and non-transitory computer-readable medium described herein, transmitting the indication of the at least one available subband may include operations, features, means, or instructions for transmitting, in the at least one available subband, a control channel conveying the indication of the at least one available subband.

In some examples of the method, apparatuses, and non-transitory computer-readable medium described herein, the control channel may be a common control channel shared by a set of UEs.

In some examples of the method, apparatuses, and non-transitory computer-readable medium described herein, determining the set of time-frequency resources of the at least one available subband for the at least one downlink signal may include operations, features, means, or instructions for identifying an intersection of the time-frequency resources indicated by the transmitted resource configuration and the subset of the frequency resources and determining, based on the identified intersection, the set of time-frequency resources within the at least one available subband for the at least one downlink signal.

In some examples of the method, apparatuses, and non-transitory computer-readable medium described herein, the transmitted resource configuration includes an SPS configuration, the SPS configuration indicating a first TBS different from a TBS associated with the at least one downlink signal received by the UE according to the determined set of time-frequency resources.

In some examples of the method, apparatuses, and non-transitory computer-readable medium described herein, the transmitted resource configuration includes an SPS configuration, where the at least one downlink signal may be encoded using a same MCS as indicated by the SPS configuration.

DETAILED DESCRIPTION

Figure 1:
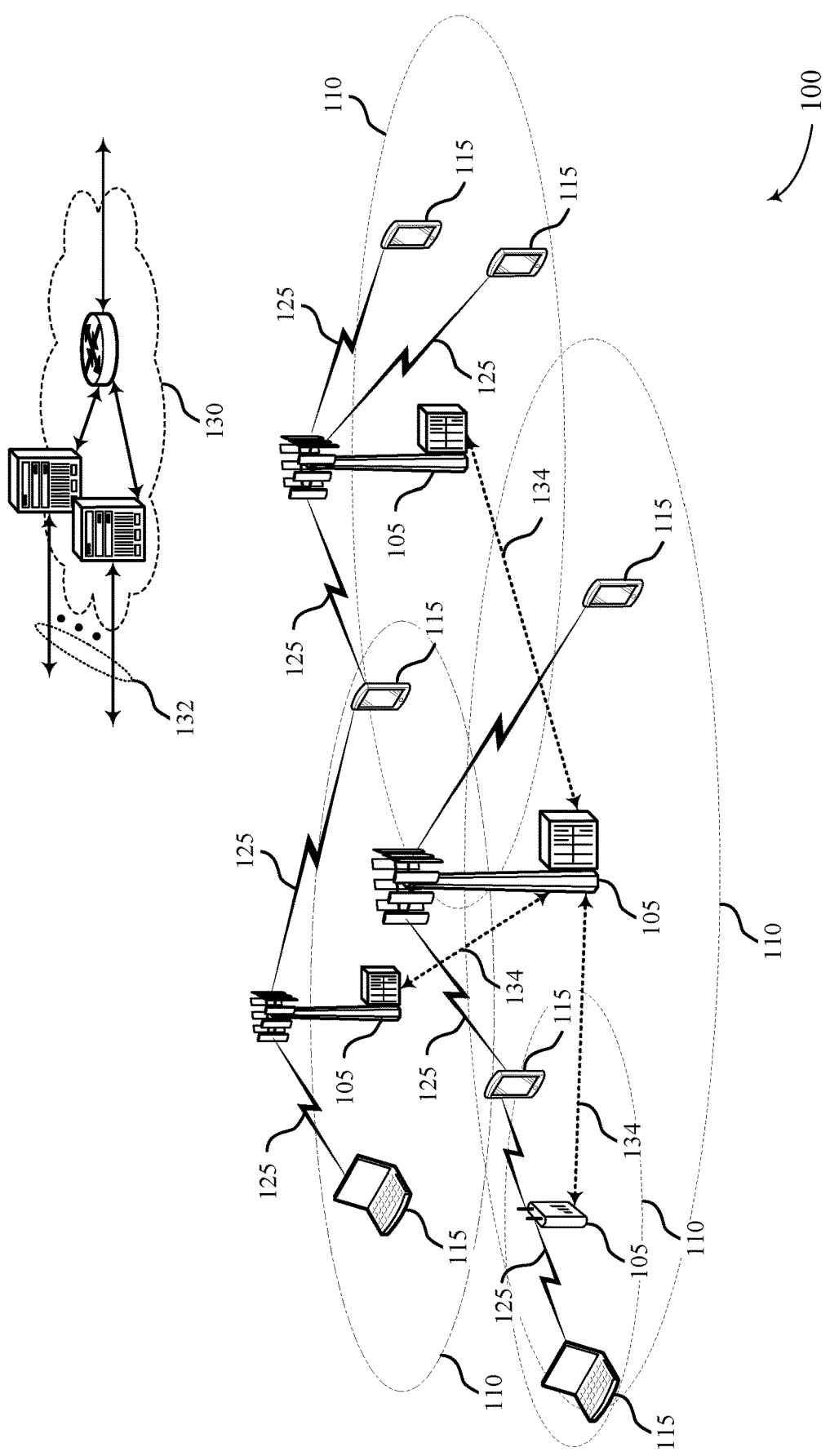
FIG. 1 illustrates an example of a system for wireless communications that supports subband usage dependent downlink signals and channels in accordance with aspects of the present disclosure.

In some wireless communications systems (e.g., New Radio (NR)), a wideband bandwidth part (BWP) (e.g., 40 MHz, 80 MHz, etc.) may be configured for unlicensed or shared licensed communications in the system (e.g., NR unlicensed (NR-U)), where the wideband BWP is divided into multiple subbands (e.g., 20 MHz sections of the wideband BWP). A base station may perform a listen-before-talk (LBT) procedure, for example on a per subband basis, to determine which subbands are available (e.g., can be used) for a transmission opportunity (TxOP), where the TxOP represents an amount of time a base station may send frames when it has won contention for a wireless medium. The base station may indicate which subbands are available for contention-based communications (e.g., subband usage) explicitly to UEs in a downlink control information message (DCI). For example, the base station may transmit a control signal for multiple UEs (e.g., in a group common physical downlink control channel (GC-PDCCH)) that indicates the available subbands in the form of a bitmap (e.g., a subband usage bitmap).

When establishing communications with one or more wireless devices, the base station may transmit configuration information semi-statically to enable the wireless devices to receive downlink information from the base station. For example, the base station may transmit channel state information reference signals (CSI-RSs), semi-persistent signaling (SPS) downlink information, control resource set (CORESET) information, etc., in radio resource control (RRC) signaling to the one or more wireless devices (e.g., in broadcasted or multicasted messages) as part of the configuration information. In some cases, the base station may transmit configuration information for the CSI-RSs, SPS downlink resources, and CORESETs in an initial RRC message and/or DCI activation message. However, this configuration information may differ from subband to subband, resulting in multiple combinations of configuration information (e.g., CSI-RS/SPS/CORESET combinations) that would be unreasonable for a base station to identify and signal to wireless devices in its coverage area.

Accordingly, the base station may use a subband usage dependent interpretation of an RRC configuration to indicate configuration information for wireless devices attempting to access one or more subbands for contention-based communications (e.g., a single RRC configuration to indicate control information for any subband within a wideband BWP). The single RRC configuration may include configurations for CSI-RSs, SPS downlink information, and/or CORESET information for the wideband BWP. For example, the base station may indicate that the CSI-RSs are transmitted periodically, semi-persistently, or aperiodically on configured resources within each subband (e.g., indicate a pattern in time across all frequency resources of the wideband BWP). Additionally or alternatively, the base station may configure a wideband downlink SPS instead of multiple downlink SPS configurations (e.g., one configuration for each subband), where resources for the SPS configuration are identified based on an intersection of its initially configured resources and the available subbands. Additionally or alternatively, the base station may also configure a CORESET over the whole wideband BWP (e.g., time and frequency resources for the CORESET), where resources for the CORESET configuration of an available subband of the wideband BWP are identified based on an intersection of the initially configured resources and the available subbands. In some cases, the CORESET configuration may be a subband usage independent CORESET (e.g., in the same place regardless of available subbands) or a subband usage dependent CORESET (e.g., based on an intersection with the available subbands).

Each CORESET may have one or more search space (SS) sets associated with it, where a UE monitors and attempts a number of blind decodes in each SS set on control channel candidates. For example, a number of physical downlink control channel (PDCCH) candidates may be present in each SS set that the base station could use to transmit information indicating a subsequent transmission for the UE (e.g., a physical downlink shared channel (PDSCH) transmission). Accordingly, if the UE successfully detects and blind decodes a PDCCH candidate, it may receive a subsequent transmission from the base station. In some cases, the UE may have a limit of how many channel elements it can check and/or a number of blind decodes it can perform. An overbooking rule may indicate this limit and prevent the UE from exceeding it (e.g., by dropping a number of blind decodes, a number of SS sets, etc.). To improve reliability that a successful blind decode occurs, the UE may continue checking additional SS sets for blind decodings if an initial SS set does not fit in the overbooking rule. Additionally or alternatively, a relatively small SS set size may be used for all SS sets such that a smaller number of blind decodes are performed in each and the overbooking rule is not enforced. To reduce the risk of collision between the smaller sized SS sets, an offset may be introduced between each SS set.

Particular aspects of the subject matter described herein may be implemented to realize one or more advantages. For example, the described techniques may support improvements in communicating on one or more subbands of a wideband BWP, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. An additional wireless communications system, a CORESET configuration, SS set configurations, and a process flow are then provided to illustrate aspects of the disclosure. Aspects of the disclosure are further illustrated by and described with reference to apparatus diagrams, system diagrams, and flowcharts that relate to subband usage dependent downlink signals and channels.

FIG. 1 illustrates an example of a wireless communications system 100 that supports subband usage dependent downlink signals and channels in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station

105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands (e.g., in the range of 300 MHz to 300 GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

For communications between a UE 115 and a base station 105, an available bandwidth of frequencies for the communications may be split into BWPs that are subsets of the available bandwidth of frequencies. A BWP may be a bandwidth where the UE 115 can transmit and/or receive information. In conventional systems, a maximum number of four (4) BWPs may be configured to the UE 115. Additionally, the UE 115 may be required to monitor a single, active BWP at a time.

When first attempting to connect to the base station 105 (e.g., an initial access procedure), the UE 115 may monitor a default initial access bandwidth defined by a master information block (MIB) received from the base station 105 as part of an initial access procedure. The MIB may be carried by a physical broadcast channel (PBCH), where the PBCH is transmitted together with synchronization signals in a synchronization signal block (SSB)/PBCH block. In some cases, the UE 115 may determine a PDCCH configuration for a system information block one (SIB1) based on reading the MIB received from the base station 105.

For the initial access procedure, an SS set for PDCCH monitoring for the SIB1 may be configured in a first CORESET (i.e., CORESET #0) and may be mapped to a SS with a first identifier (i.e., SS #0). The UE may monitor that SS for a PDCCH that schedules a PDSCH, and may identify, from the PDCCH or other dedicated signaling (e.g., RRC signaling), a time domain resource allocation for the scheduled PDSCH. The UE may decode the PDSCH, in accordance with the time domain resource allocation, to obtain control information from the PDSCH. A CORESET may define a frequency resource and a time duration of an SS. Additionally, a CORESET may be associated with multiple SSs having a same frequency resource and time duration. An SS set may include multiple SSs each associated with a single aggregation level (AL).

The network (e.g., a base station, network controller, etc.) may configure CORESETs and SS sets for a UE to enable PDCCH monitoring. The network may configure parameters per CORESET, such as frequency domain RBs and time duration in symbols of a control region for receiving control information. Additionally or alternatively, the network may configure different parameters per SS set, such as time domain location of the control region (e.g., slot and symbols in the slots where PDCCH is transmitted). In some cases, the network may configure one or more CORESETs and one or more SS sets for the UE. Additionally, a slot may contain zero, one, or more than one control regions for indicating the control information. Within the control region(s), one SS set may be associated with one CORESET, and multiple SS sets may be associated with a CORESET. Accordingly, when an SS set is configured, the associated CORESET may be specified. For example, one SS set may be indicated by one CORESET, but the CORESET may indicate multiple SS sets including the one SS set. Each CORESET may be one, two, or three symbols in duration, where each CORESET includes one or more control channel elements (CCEs) that occupy all symbols configured by the CORESET within an SS set occasion (e.g., one, two, or three symbols).

In some wireless communications systems (e.g., NR), a wideband BWP (e.g., 80 MHz) may be configured for unlicensed communications in the system (e.g., NR unlicensed (NR-U)), where the wideband BWP is divided into multiple subbands (e.g., 20 MHz sections of the wideband BWP). The base station may perform an LBT procedure per subband and determine which subbands are available (e.g., can be used) for a current TxOP, where the TxOP represents an amount of time the base station 105 may send frames when it has won contention for a wireless medium. When operating in shared radio frequency (RF) spectrum bands (e.g., unlicensed or shared licensed RF spectrum bands), wireless devices such as base stations 105 and UEs 115 may employ LBT procedures to ensure a frequency channel (e.g., subband) is clear before transmitting data. For example, the base station 105 may listen to a subband, and if no communications are detected on the subband or any frequency channel on the subband, the subband may be determined to be available for subsequent communications. Additionally or alternatively, if communications are detected on a subband or any channel on the subband, the subband may be determined to be unavailable for the subsequent communications.

The base station 105 may indicate which subbands are available for contention-based communications (e.g., subband usage) explicitly to UEs 115 in a DCI message. For example, the base station 105 may transmit a GC-PDCCH that indicates the available subbands in the form of a bitmap (e.g., a subband usage bitmap). When establishing communications with one or more wireless devices, the base station 105 may transmit configuration information semi-statically to enable the wireless devices to receive downlink information from the base station 105 over the wideband BWP. For example, the base station 105 may transmit CSI-RSs, SPS downlink information, CORESET information, etc., in RRC signaling to the one or more wireless devices (e.g., in broadcasted or multicasted messages) as part of the configuration information. In some cases, the base station 105 may transmit configuration information for the CSI-RSs, SPS downlink resources, and CORESETs in an initial RRC message and/or DCI activation message. However, this configuration information may differ from subband to subband, resulting in multiple combinations of configuration information (e.g., CSI-RS/SPS/CORESET combinations) that would be unreasonable for a base station 105 to identify and signal to wireless devices in its coverage area 110.

Wireless communications system 100 may support efficient techniques for indicating subband usage dependent downlink signals and channels. For example, a base station 105 may use a subband usage dependent interpretation of an RRC configuration to indicate configuration information for wireless devices attempting to access one or more subbands for contention-based communications (e.g., a single RRC configuration to indicate control information for any subband within a wideband BWP). The single RRC configuration may include configurations for CSI-RSs, SPS downlink information, and CORESET information. As such, when a UE 115 receives a subband usage bitmap indicating available subbands in a wideband BWP (e.g., in a GC-PDCCH), it may apply the single RRC configuration for the corresponding reference information.

For example, the base station 105 may indicate that the CSI-RSs are transmitted periodically, semi-persistently, or aperiodically on configured resources within each subband (e.g., indicate a pattern in time across all frequency resources of the wideband BWP). Additionally or alternatively, the base station may configure a wideband downlink SPS instead of multiple downlink SPS configurations (e.g., one on each subband), where resources for the SPS configuration are identified based on an intersection of its initially configured resources and the available subbands. Additionally or alternatively, the base station may also configure a CORESET over the whole wideband BWP (e.g., time and frequency resources for the CORESET), where resources for the CORESET configuration are identified based on an intersection of its initially configured resources and the available subbands. In some cases, the CORESET configuration may be a subband usage independent CORESET (e.g., in the same place regardless of available subbands) or a subband usage dependent CORESET (e.g., based on an intersection with the available subbands).

Figure 2:
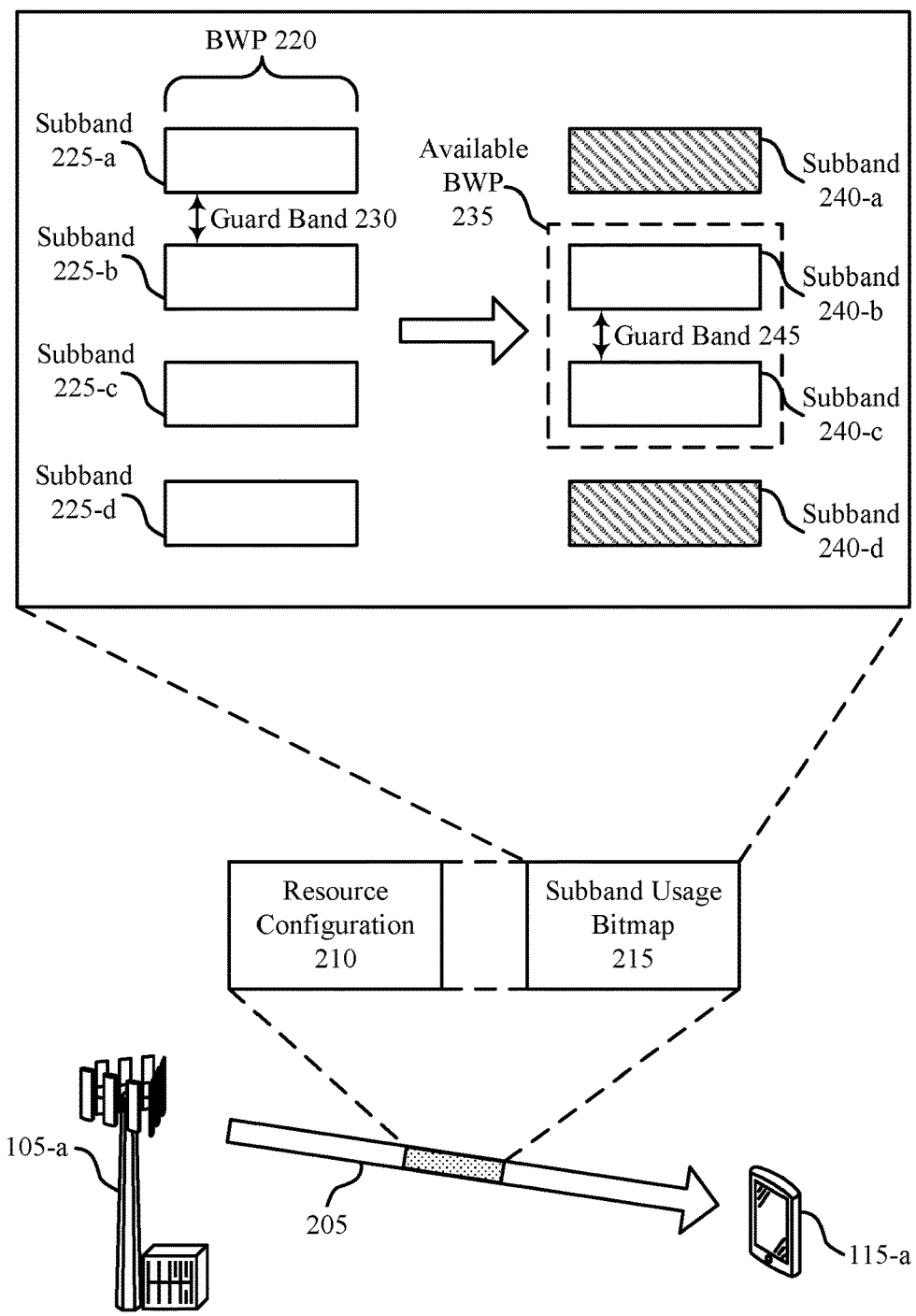
FIG. 2 illustrates an example of a wireless communications system that supports subband usage dependent downlink signals and channels in accordance with aspects of the present disclosure.

FIG. 2 illustrates an example of a wireless communications system 200 that supports subband usage dependent downlink signals and channels in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UE 115, respectively, as described herein with reference to FIG. 1. As described herein, base station 105-a and UE 115-a may be attempting to communicate in an unlicensed RF spectrum band (e.g., shared RF spectrum band). Additionally, base station 105-a may configure one or more BWPs for communications with nearby wireless devices (e.g., UE 115-a), with a single active BWP 220 (e.g., a wideband BWP) being used for the communications.

Base station 105-a may transmit downlink information to UE 115-a on a carrier 205. For example, base station 105-a may transmit a resource configuration 210 to indicate how reference signals, scheduling information, and control information is configured and indicated on BWP 220. For example, base station 105-a may transmit CSI-RSs, SPS downlink information, CORESET information, etc., in RRC signaling to UE 115-a (e.g., in broadcasted or multicasted messages) as part of resource configuration 210. In some cases, base station 105-*a* may transmit resource configuration 210 to UE 115-*a* in an initial RRC message and/or DCI activation message. Additionally, as described herein, BWP 220 may be divided into one or more subbands 225. For BWP 220 with subbands 225, base station 105-*a* may configure UE 115-*a* with information about the subbands 225, including guard bands 230 between the subbands 225.

Additionally, based on UE 115-*a* and base station 105-*a* attempting to communicate in the unlicensed (or shared) RF spectrum band, base station 105-*a* may perform an LBT procedure to determine which subbands 225 are available for communications (e.g., are not being used for current communications). Once the available subbands are determined, base station 105-*a* may indicate them to UE 115-*a* in a subband usage bitmap 215 on carrier 205. In some cases, subband usage bitmap 215 may be indicated in a GC-PDCCH. As shown, an available BWP 235 may be indicated by subband usage bitmap 215, where subbands 240-*a* and 240-*d* were determined to be unavailable for UE 115-*a* and are unused in available BWP 235, while subbands 240-*b* and 240-*c* are determined to be available for UE 115-*a* and are used in available BWP 235 for unlicensed communications.

Based on the subband usage bitmap 215, UE 115 may determine whether guard bands 230 between two subbands 225 are used or not. For example, as shown, if adjacent subbands 240-*b* and 240-*c* are available for use, a guard band 245 between the two subbands 240 may be used as well for available BWP 235. In some cases, base station 105-*a* may configure UE 115-*a* to monitor for the GC-PDCCH carrying subband usage bitmap 215. Additionally, if UE 115-*a* detects a GC-PDCCH carrying subband usage bitmap 215, the effective range of the bitmap may be a TxOP between base station 105-*a* and UE 115-*a* (e.g., the bitmap applies for the TxOP). In some cases, subband usage bitmap 215 may not be continuous in time and/or frequency (e.g., based on the availability of each subband 225 of BWP 220 at any given time). Additionally, the UE may detect the TxOP structure (e.g., in the same GC-PDCCH or another GC-PDCCH) based on detecting subband usage bitmap 215.

When establishing communications with UE 115-*a* (e.g., and additional wireless devices), base station 105-*a* may transmit resource configuration 210 semi-statically to enable UE 115-*a* to receive downlink information from base station 105-*a*. For example, resource configuration 210 may include CSI-RSs, SPS downlink information, CORESET information, etc., in RRC signaling to UE 115-*a*. However, conventionally, this configuration information may differ from subband 225 to subband 225 of BWP 220, resulting in multiple combinations of configuration information (e.g., CSI-RS/SPS/CORESET combinations) that would be unreasonable for base station 105-*a* to identify and signal to UE 115-*a* (e.g., and other wireless devices in its coverage area). Accordingly, as described herein, to reduce signaling overhead and prevent determining the multiple combinations, base station 105-*a* may use a subband usage dependent interpretation of an RRC configuration to indicate configuration information for UE 115-*a* (and other wireless devices) attempting to access one or more subbands 240 of an available BWP 235 for contention-based communications (e.g., a single RRC configuration to indicate control information for any subband 240 within available BWP 235).

The single RRC configuration (e.g., resource configuration 210) may include configurations for CSI-RSs, SPS downlink information, and CORESET information. In some cases, base station 105-*a* may indicate that the CSI-RSs are transmitted periodically, semi-persistently, or aperiodically on configured resources within each subband 240. For example, base station 105-*a* may indicate a pattern in resource configuration 210 that indicates how often CSI-RSs are transmitted across all resources of BWP 220 that is initially configured (e.g., the second slot or subframe of BWP 220, every 4th slot or subframe of BWP 220, etc.). Accordingly, for available BWP 235, UE 115-*a* may receive the CSI-RSs at resources according to the indicated pattern in subband 240-*b*, guard band 245, and subband 240-*c*. For CSI computation, UE 115-*a* may assume that CSI-RSs within the available subbands (and available guard bands) are transmitted (e.g., in subband 240-*b*, guard band 245, and subband 240-*c*). Additionally, if the subbands used for the contention-based communications (e.g., available subbands) are not continuous, the CSI-RSs transmitted similarly may not be continuous (e.g., in frequency).

Additionally or alternatively, base station 105-*a* may configure a wideband downlink SPS across BWP 220 instead of multiple downlink SPS configurations (e.g., one on each subband 225). Accordingly, based on the available subbands 240-*b* and 240-*c*, the downlink SPS may not be continuous, but may have one or more resources allocated on each subband or a set of subbands. Base station 105-*a* may configure UE 115-*a* to monitor for subband usage bitmap 215 as described herein (e.g., in the GC-PDCCH). When subband usage bitmap 215 is received, UE 115-*a* may interpret the downlink SPS resource allocation to be an intersection of the allocated resources for downlink SPS (e.g., in resource configuration 210) and resources indicated as available in subband usage bitmap 215 (e.g., available subbands 240-*b* and 240-*c*). Initial characteristics (e.g., modulation and coding scheme (MCS)) of the configured downlink SPS for BWP 220 may still apply for the downlink SPS transmitted based on available subbands 240-*b* and 240-*c* in available BWP 235, but a transport block size (TBS) of the configured downlink SPS may be reduced for the altered downlink SPS transmitted in available BWP 235.

Base station 105-*a* may also configure a CORESET over BWP 220 (e.g., time and frequency resources for the CORESET) via resource configuration 210. In some cases, the CORESET may not be continuous, but can have segments in each subband 225 or a set of subbands 225 to increase reliability of it being detected. As described herein, base station 105-*a* (e.g., or network) may configure UE 115-*a* to monitor for subband usage bitmap 215 (e.g., in a GC-PDCCH). When subband usage bitmap 215 is received, UE 115-*a* may determine an actual control channel resource based on an intersection of allocated resources (e.g., in resource configuration) for the CORESET and resources indicated as available in the bitmap (e.g., available subbands 240-*b* and 240-*c*). The initially configured CORESET may be further reduced based on control channel element (CCE) alignments. For example, if there is a partial CCE in a resulting reduced CORESET based on the available subbands 240-*b* and 240-*c*, the full CCE may be removed from the CORESET. A configured SS set may be hashed (e.g., based on a hashing function that determines location of PDCCH candidates configured by SS sets) to the remaining part of the CORESET. In some cases, the GC-PDCCH carrying subband usage bitmap 215 may be carried in a CORESET, and, as such, the CORESET cannot depend on subband usage bitmap 215. Additionally, a UE may not detect the GC-PDCCH carrying subband usage bitmap 215 based on, for example, interference (e.g., the GC-PDCCH is not infinitely reliable). As such, the CORESET configuration may be further enhanced to prevent the dependency on subband usage bitmap 215 and increase reliability of configuration information being received if GC-PDCCH is not received.

Figure 3:
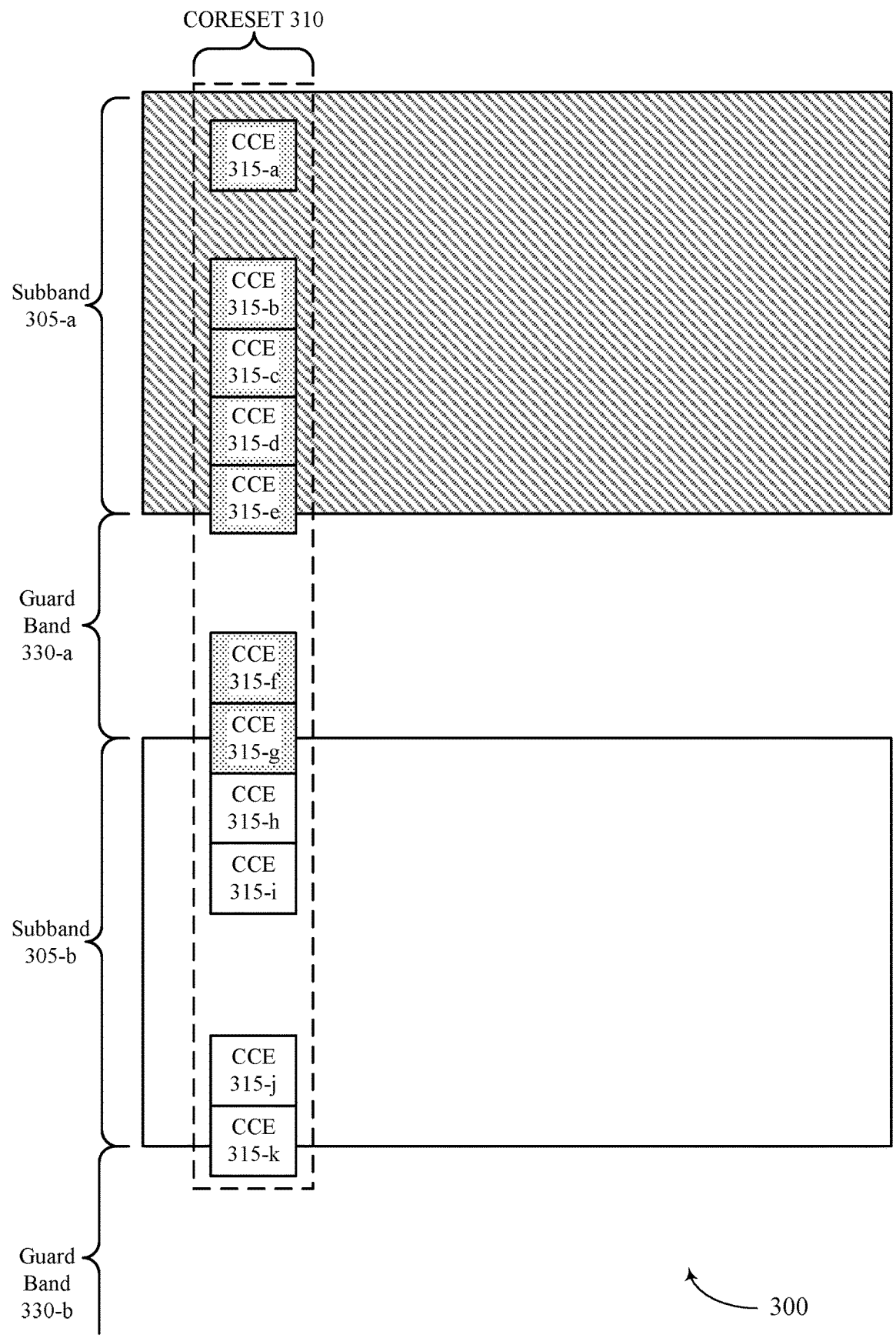
FIG. 3 illustrates an example of a control resource set (CORESET) configuration that supports subband usage dependent downlink signals and channels in accordance with aspects of the present disclosure.

FIG. 3 illustrates an example of a CORESET configuration 300 that supports subband usage dependent downlink signals and channels in accordance with aspects of the present disclosure. In some examples, CORESET configuration 300 may implement aspects of wireless communications systems 100 and/or 200. CORESET configuration 300 may be utilized for a BWP used for contention-based communications between a base station 105 and a UE 115 as described herein. CORESET configuration 300 may include a CORESET 310 that are configured for over the entire BWP, including subbands 305-*a* and 305-*b*. As shown and as an example, CORESET 310 may be one symbol in duration, but it is to be understood that CORESET 310 may span more symbols (e.g., two or three). Accordingly, each CCE 315 within CORESET 310 may occupy all symbols configured by a CORESET within an SS set occasion (e.g., one symbol as shown, or two or three symbols based on the CORESET size in the time domain). In some cases, subband 305-*a* may be determined to be unavailable for communications based on an LBT procedure, while subband 305-*b* may be determined to be available for communications based on the LBT procedure performed by the base station 105.

To transmit the GC-PDCCH and corresponding subband usage bitmap before defining CORESET 310, the base station 105 (e.g., or the network) may configure a subband usage independent CORESET, where the resources for the CORESET do not depend on which subbands are available (e.g., based on subband usage), even if the subband bitmap monitoring is configured for the UE 115. Accordingly, the GC-PDCCH carrying the subband usage bitmap may be transmitted in this subband usage independent CORESET. As shown, even though subband 305-*a* is unavailable for contention-based communications, CCEs 315 of CORESET 310 may still be considered as available CCEs in subband 305-*a* and a guard period between subbands 305-*a* and 305-*b*. Accordingly, the UE 115 may detect and receive the GC-PDCCH in any of the CCEs in any of the subbands 305, which would then indicate the available subbands (e.g., subband 305-*b*) for identifying available search spaces to perform blind decodes in.

Additionally, to increase reliability if the GC-PDCCH and subband usage bitmap are not detected, other DCIs may be transmitted in the subband usage independent CORESET to maintain a robust control link with the UE. As such, the UE 115 may still detect and receive some control information to indicate where an SS set is located, where the CORESET is located, the available subbands, and/or other information to identify subsequent communications. For an SS set configured on the subband usage independent CORESET, hashing may be used to determine the locations of PDCCH candidates for blind decodes. If a subband usage bitmap is detected and a PDCCH candidate at least partly falls in an unavailable subband (e.g., an unused subband for the contention-based communications), the UE may refrain from decoding the PDCCH candidate. Additionally, an SS set (i.e., in the control region) may be partially dropped from the reduced CORESET resource based on the PDCCH candidate falling in an unavailable subband (or other unavailable parts of the BWP). For example, time and frequency resources that correspond to the PDCCH candidates that (partially) fall in the unavailable subband(s) may be dropped from the SS set indication in the CORESET resource. As such, the number of blind decodes performed by the UE on the PDCCH candidates may be reduced, where the saved blind decodes and CCEs may be useable for other SS sets. For example, SS sets with larger indexes following a PDCCH overbooking rule may be searched based on the saved blind decodes.

Additionally or alternatively, the base station 105 may configure subband usage dependent CORESETs, where resources for the CORESETs 310 are determined based on an intersection of allocated resources (e.g., in the prior received RRC signal or the activation DCI) for the CORESETs 310 and resources indicated as available in the subband usage bitmap (e.g., the available subbands). For example, CCEs 315 that are fully located within subband 305-*b* may be transmitted as part of CORESET 310 based on the intersection of available subband 305-*b* and the configured originally configured CORESET 310. Additionally, CCEs 315 located in a guard band 330-*b* may be included in the subband usage dependent CORESETs based on a subband 305 below subband 305-*b* also being available for communications.

SS sets associated with the subband usage dependent CORESETs may be affected by whether or not the UE 115 detects the subband usage bitmap. For example, when the subband usage bitmap is not detected, the UE 115 may perform blind decodes on all PDCCH candidates in the wideband BWP (e.g., based on an all one (1) bitmap) or perform no blind decodes (e.g., based on an all zero (0) bitmap). To achieve the latter (e.g., based on an all zero (0) bitmap), the base station 105 may configure indexes for SS sets associated with the subband usage dependent CORESETs to be larger than SS sets for subband usage independent CORESETs, and the SS sets for the subband usage independent CORESETs may be configured to have enough blind decodings such that all SS sets on the subband usage dependent CORESETs are to be dropped at the beginning. Additionally or alternatively, when the subband usage bitmap is detected, the SS set for the subband usage dependent CORESETs may be hashed in the resulting CCEs of CORESET 310. In some cases, the hashing may depend on the actual CORESET resource (e.g., subband usage dependent CORESET) reliability. SS sets may occupy part of, all of, or parts of more than one CCE 315 within CORESET 310. Accordingly, the UE 115 may monitor the SS sets for PDCCH candidates to identify resources for subsequent communications (e.g., PDSCH transmissions).

Figure 4A:
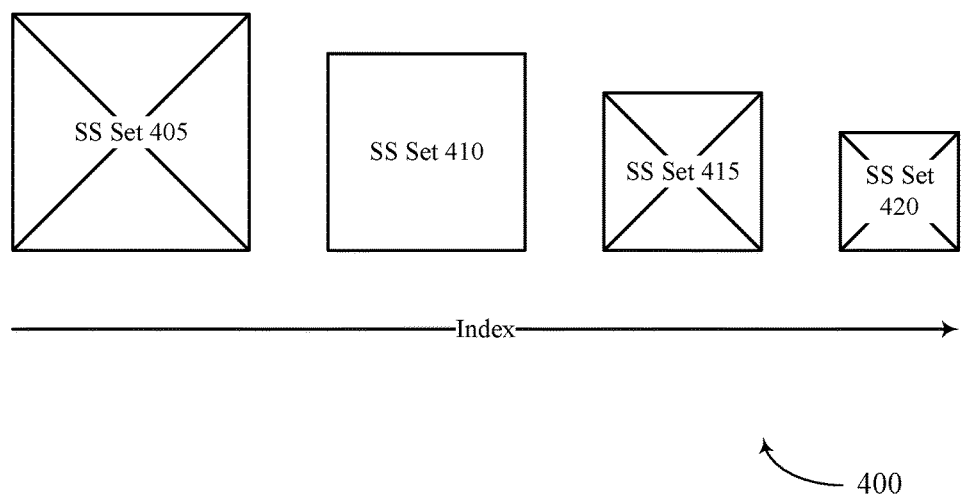
FIGS. 4A and 4B illustrate examples of search space (SS) set configurations that support subband usage dependent downlink signals and channels in accordance with aspects of the present disclosure.
Figure 4B:
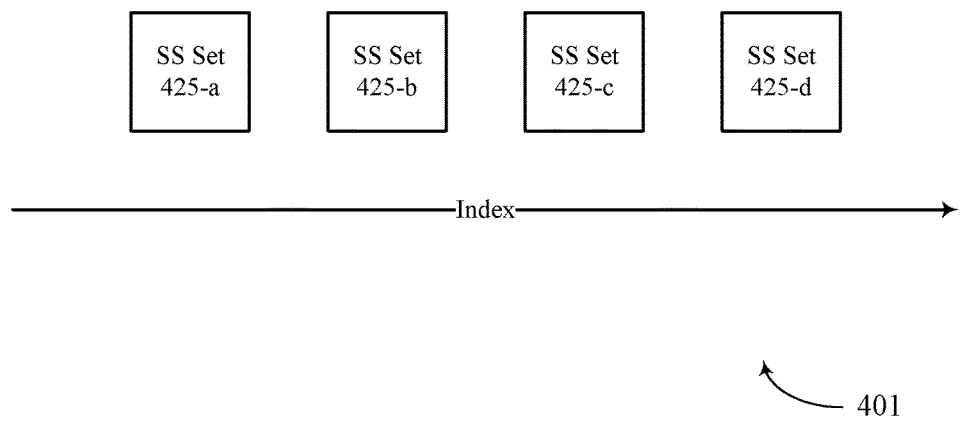

FIGS. 4A and 4B illustrate examples of SS set configurations 400 and 401, respectively, that support subband usage dependent downlink signals and channels in accordance with aspects of the present disclosure. In some examples, SS set configurations 400 and 401 may implement aspects of wireless communications systems 100 and/or 200. SS set configurations 400 and 401 may illustrate how SS sets are configured for subband usage dependent CORESETs as described herein with reference to FIG. 3. As such, CORESETs and associated SS sets may be determined based on the intersection of allocated resources for the CORESET and resources indicated as available in a subband usage bitmap. Additionally, as described herein with reference to FIG. 1, an SS set may include multiple SSs each associated with a single AL.

In some cases, UEs 115 or base stations 105 may include limits on a number of CCEs that may be used for control information transmission in a TTI (e.g., a slot). Additionally or alternatively, the UE may include limits on a number of blind decodes it can perform in a TTI. In some cases, the base station may overbook the PDCCH candidates past a CCE limit and/or blind decode limit. In response, the base station may implement an overbooking rule to determine CCEs and/or blind decodes to drop from the configuration. In some cases, the base station may drop entire SS sets to meet the CCE/blind decode limit. In other cases, the base station may drop PDCCH candidates of one or more SS sets to meet the CCE/blind decode limit. The base station may determine the SS sets or candidates to drop based on SS set priority values, SS set identifiers, candidate indexes, candidate aggregation levels, associated DCI formats, RNTIs, or some combination of these parameters. Additionally or alternatively, the base station may drop CCEs based on the blind decoding attempts limit. Performing the CCE dropping procedure may allow the base station to support and maintain the SS set CCE or candidate limits. The base station may transmit control information using the configured SS set (e.g., based on pseudo SS candidates, the dropped CCEs, or both), and the UE may monitor and decode control information according to the configuration.

Before LBT results are known to indicate which subbands are available for contention-based communications, the UE 115 may not know how many blind decodings can be saved from a subband usage independent CORESET in comparison with the subband usage dependent CORESET. When less subbands are checked for blind decodes (e.g., based on a subset of the subbands being available for the contention-based communications), more blind decodes may be left over for the UE 115. Accordingly, the base station 105 may configure the SS sets for the subband usage dependent CORESETs to adapt to the variable number of blind decodes available to the UE 115. For example, the base station 105 may configure SS sets for the subband usage dependent CORESETs with larger number of blind decodings with smaller indexes. As shown in SS set configuration 400, a first SS set 405 may include the most blind decodes and have a smallest index, a second SS set 410 may include the second most blind decodes and have a second smallest index, a third SS set 415 may include the third most blind decodes and have a third smallest index, and a fourth SS set 420 may include the least blind decodes and have the largest index.

As such, the largest SS set with an available number of blind decodings may be searched (e.g., used) by the UE 115 first (e.g., SS set 405). Conventionally, if an SS set does not fit (e.g., the number of blind decodes are greater than a limit for the UE), the overbooking may stop, and the UE 115 may stop checking subsequent SS sets (e.g., those SS sets having a larger index value) for blind decodings. As described herein, if the SS set does not fit, the UE 115 may continue checking subsequent SS sets for blind decodings. For example, SS set 405 may include too many blind decodes for the UE 115 to check, but rather than stopping checking for and performing the blind decodes as part of the overbooking, the UE 115 may check SS set 410. After decoding SS set 410, the remaining decoding budget may not be enough for it to decode a next SS set (e.g., SS set 415).

Additionally or alternatively, the base station may configure multiple SS sets, each with a relatively small size (e.g., small numbers of PDCCH candidates for blind decodes, which size may be the same between two or more of the SS sets). For example, as shown in SS set configuration 401, multiple SS sets 425 may be configured with a same size (e.g., the relatively small size). If more blind decodes are available based on a blind decoding budget for the UE 115 after the initial SS sets 425 are configured, the base station 105 may add more SS sets 425 based on the overbooking rule. However, when multiple SS sets 425 are hashed in the same subband usage dependent CORESET, the chance of collision between SS sets and/or PDCCH candidates may be higher. For example, if the aggregation level (AL) (e.g., the number of CCEs) in multiple SS sets are associated with the same number of PDCCH candidates, collisions may occur between the SS sets. To reduce the risk of collision, the base station 105 may include offsets in the hashing when determining the locations of the PDCCH candidates in the SS sets, where the offset may depend on the SS set index or a number based on a counter of configured SS sets). For example, a second configured SS set (e.g., SS set 425-b) may be offset from a first configured SS set (e.g., SS set 425-a) during the hashing such that they do not collide at the UE 115.

In some cases, the collisions may occur between different SS sets having a same ordering of SS sets within each SS set in the subband usage dependent CORESET. Accordingly, the offset may alter the orderings of the SS sets to prevent collisions from occurring between SS sets 425. Additionally or alternatively, the offset may alter the resource allocation (e.g., frequency allocation) from a prior SS set 425 to a subsequent SS set 425 to prevent any collisions.

Figure 5:
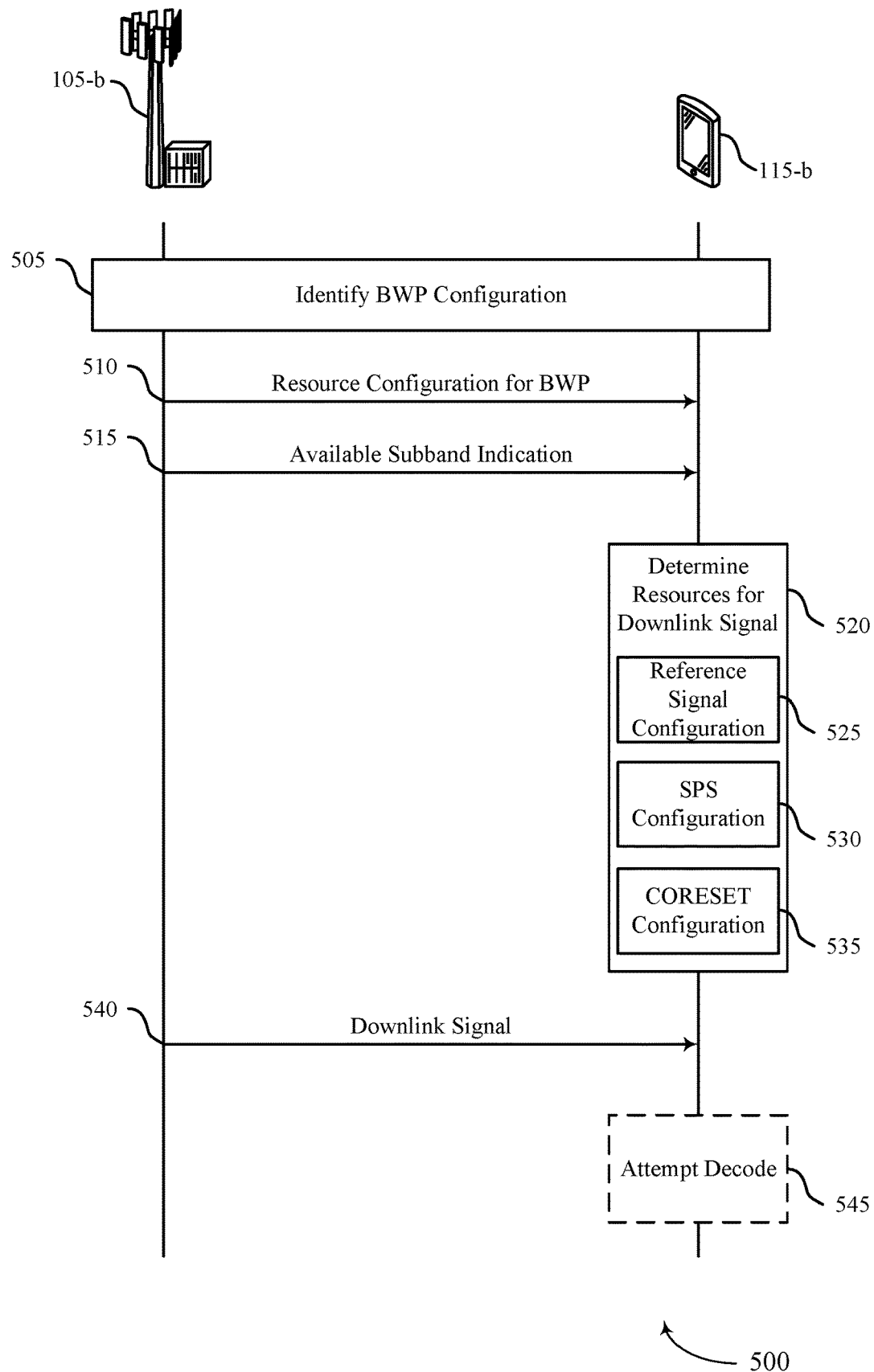
FIG. 5 illustrates an example of a process flow that supports subband usage dependent downlink signals and channels in accordance with aspects of the present disclosure.

FIG. 5 illustrates an example of a process flow 500 that supports subband usage dependent downlink signals and channels in accordance with aspects of the present disclosure. In some examples, process flow 500 may implement aspects of wireless communications systems 100 and/or 200. Process flow 500 may include a base station 105-b and a UE 115-a, which may be examples of base stations 105 and UEs 115 as described herein with reference to FIGS. 1-4.

In the following description of the process flow 500, the operations between base station 105-b and UE 115-b may be transmitted in a different order than the exemplary order shown, or the operations performed by base station 105-b and UE 115-b may be performed in different orders or at different times. Some operations may also be left out of the process flow 500, or other operations may be added to the process flow 500.

At 505, base station 105-b and UE 115-b may determine a BWP configuration for UE 115-b, the BWP configuration indicating a set of frequency resources of a shared RF spectrum band.

At 510, base station 105-b may transmit, to UE 115-b, a resource configuration for the BWP, the resource configuration indicating a set of subbands for the BWP and time-frequency resources to be used by the UE to receive at least one downlink signal.

At 515, base station 105-b may transmit and UE 115-b may receive, during a TxOP, an indication of at least one available subband of the set of subbands for the TxOP, the at least one available subband comprising a subset of the frequency resources. Additionally, UE 115-b may receive, in the at least one available subband, a control channel conveying the indication of the at least one available subband. In some cases, the control channel may be a common control channel shared by a set of UEs (e.g., a GC-PDCCH).

At 520, UE 115-b may determine, based on the received resource configuration for the BWP and the received indication of the at least one available subband, a set of time-frequency resources of the at least one available subband for the at least one downlink signal.

At 525, where the resource configuration includes a reference signal configuration (e.g., CSI-RS) for the BWP, UE 115-b may determine, based on the received reference signal configuration and the received indication, resources of the at least one available subband to monitor for reference signals during the TxOP.

At 530, where the resource configuration includes an SPS configuration for the BWP, UE 115-b may determine, based on the received SPS configuration and the received indication, resources within the at least one available subband to use to receive downlink data during the TxOP. In some cases, UE 115-*b* may identify an intersection of the time-frequency resources indicated by the received resource configuration and the subset of the frequency resources. Accordingly, UE 115-*b* may determine, based on the identified intersection, the set of time-frequency resources within the at least one available subband for the at least one downlink signal. In some cases, the received resource configuration may include an SPS configuration, the SPS configuration indicating a first TBS different from a TBS associated with the at least one downlink signal received by the UE according to the determined set of time-frequency resources. Additionally or alternatively, the received resource configuration may include an SPS configuration, where the at least one downlink signal is encoded using a same modulation and coding scheme as indicated by the SPS configuration.

At 535, where the resource configuration includes a CORESET configuration for the BWP, UE 115-*b* may determine, based on the received CORESET configuration and the received indication, a set of control channel candidates for the at least one available subband during the TxOP. In some cases, UE 115-*b* may identify, for the BWP, a set of control channel candidates indicated by the CORESET configuration and may determine the set of control channel candidates based on at least one of the identified set of control channel candidates being within the at least one available subband. Additionally, UE 115-*b* may identify a control channel candidate for which at least a portion is outside the at least one available subband and may drop the identified control channel candidate.

In some cases, UE 115-*b* may identify an intersection of a reference CORESET indicated by the received CORESET configuration and the indicated subband, determine the CORESET for the at least one available subband from the identified intersection, and may determine, based on the determined CORESET, the set of control channel candidates for the at least one available subband.

While UE 115-*b* is shown performing 520, 525, 530, 535, it is to be understood that base station 105-*b* may similarly perform same determinations.

At 540, base station 105-*b* may transmit and UE 115-*a* may receive, during the TxOP, the at least one downlink signal according to the determined set of time-frequency resources.

At 545, UE 115-*b* may attempt to decode, according to the determined set of control channel candidates, a control signal for the at least one available subband during the TxOP, the received at least one downlink signal comprising the control signal. In some cases, UE 115-*b* may identify a set of search space sets for the at least one available subband, the set of search space sets including at least a first search space set and a second search space set, determine whether a first number of control channel candidates of the first search space set exceeds a blind decoding threshold. UE 115-*b* may then determine, based on the first search space set exceeding the blind decoding threshold, whether a second number of control channel candidates of the second search space set exceeds the blind decoding threshold and may attempt to decode the control signal according to the second search space set based on the second search space set not exceeding the blind decoding threshold.

Additionally or alternatively, UE 115-*b* may identify a set of search space sets for the at least one available subband, each of the set of search space sets associated with an index value. UE 115-*b* may then identifying an offset for a search space set of the set of search space sets based on the index value associated with the search space set and may attempt to decode the control signal according to the search space set and the identified offset. In some cases, UE 115-*b* may attempt to decode the control signal according to one or more of a set of search space sets, at least one of the set of search space sets comprising a UE specific search space set.

Figure 6:
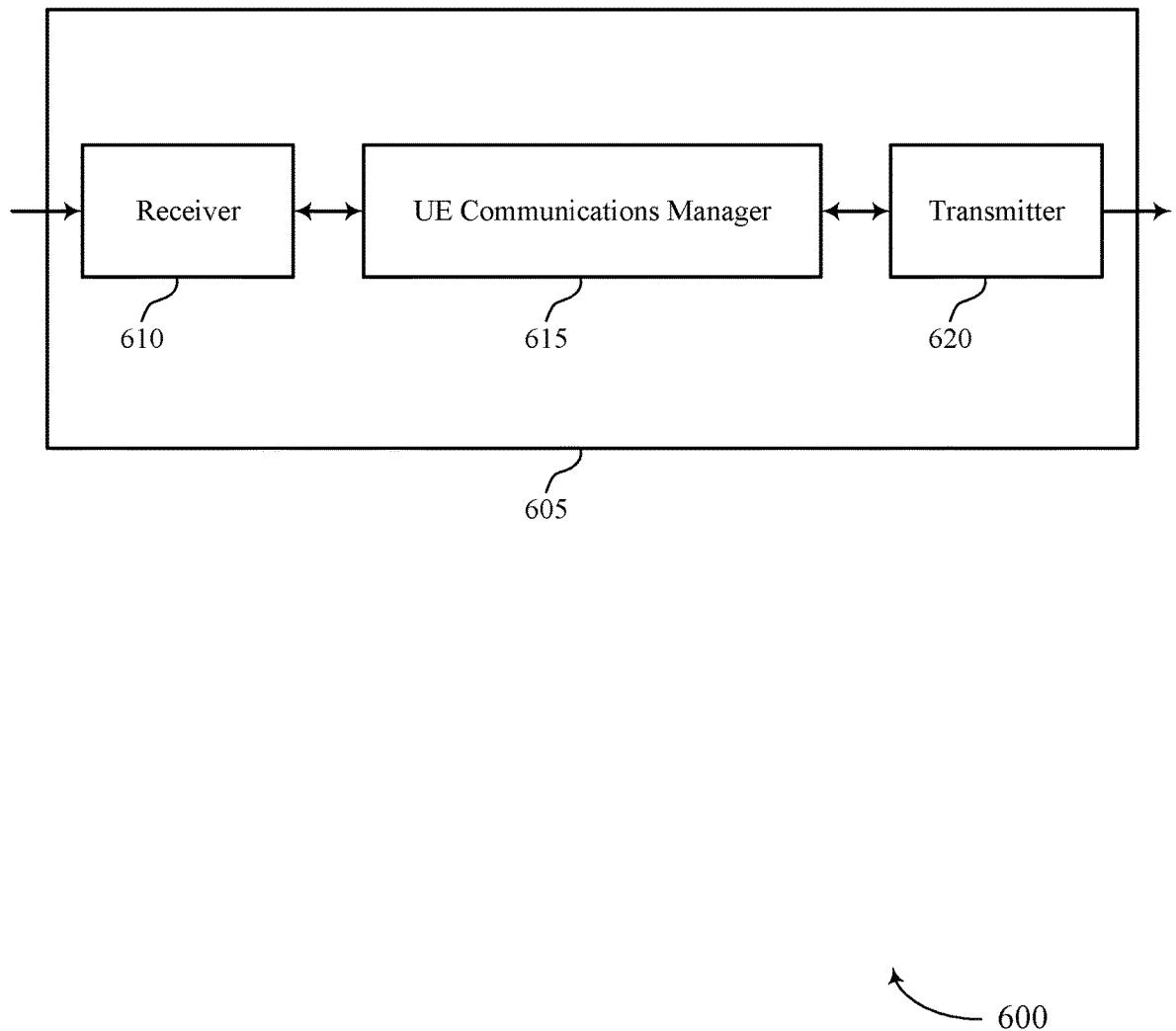
FIGS. 6 and 7 show block diagrams of devices that support subband usage dependent downlink signals and channels in accordance with aspects of the present disclosure.

FIG. 6 shows a block diagram 600 of a device 605 that supports subband usage dependent downlink signals and channels in accordance with aspects of the present disclosure. The device 605 may be an example of aspects of a UE 115 as described herein. The device 605 may include a receiver 610, a UE communications manager 615, and a transmitter 620. The device 605 may also include one or more processors, memory coupled with the one or more processors, and instructions stored in the memory that are executable by the one or more processors to enable the one or more processors to perform the identifying of BWP configuration features discussed herein. Each of these components may be in communication with one another (e.g., via one or more buses).

The receiver 610 may receive information such as packets, user data, or control information associated with various information channels (e.g., control channels, data channels, and information related to subband usage dependent downlink signals and channels, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may identify a BWP configuration for the UE, the BWP configuration indicating a set of frequency resources of a shared RF spectrum band. In some cases, the UE communications manager 615 may receive a resource configuration for the BWP, the resource configuration indicating a set of subbands for the BWP and time-frequency resources to be used by the UE to receive at least one downlink signal. Additionally, the UE communications manager 615 may receive, during a TxOP, an indication of at least one available subband of the set of subbands for the TxOP, the at least one available subband including a subset of the frequency resources. The UE communications manager 615 may determine, based on the received resource configuration for the BWP and the received indication of the at least one available subband, a set of time-frequency resources of the at least one available subband for the at least one downlink signal. In some cases, The UE communications manager 615 may receive, during the TxOP, the at least one downlink signal according to the determined set of time-frequency resources. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the UE communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The UE communications manager 615 as described herein may be implemented to realize one or more potential advantages. One implementation may allow the device 605 to receive a resource configuration, indicating at least one available subband of a plurality of subbands and time-frequency resources, and determine a set of time-frequency resources of the at least one available subband of a downlink signal. Communicating on the available subband may increase reliability and reduce latency during transmissions.

Based on techniques for determining a set of time-frequency resources of at least one available subband for a downlink signal as described herein, UE communications manager 615 may increase reliability, decrease power consumption, and decrease signaling overhead for the UE 115 in the communication because the UE 115 may avoid going through unnecessary configuration processes during communications.

Figure 7:
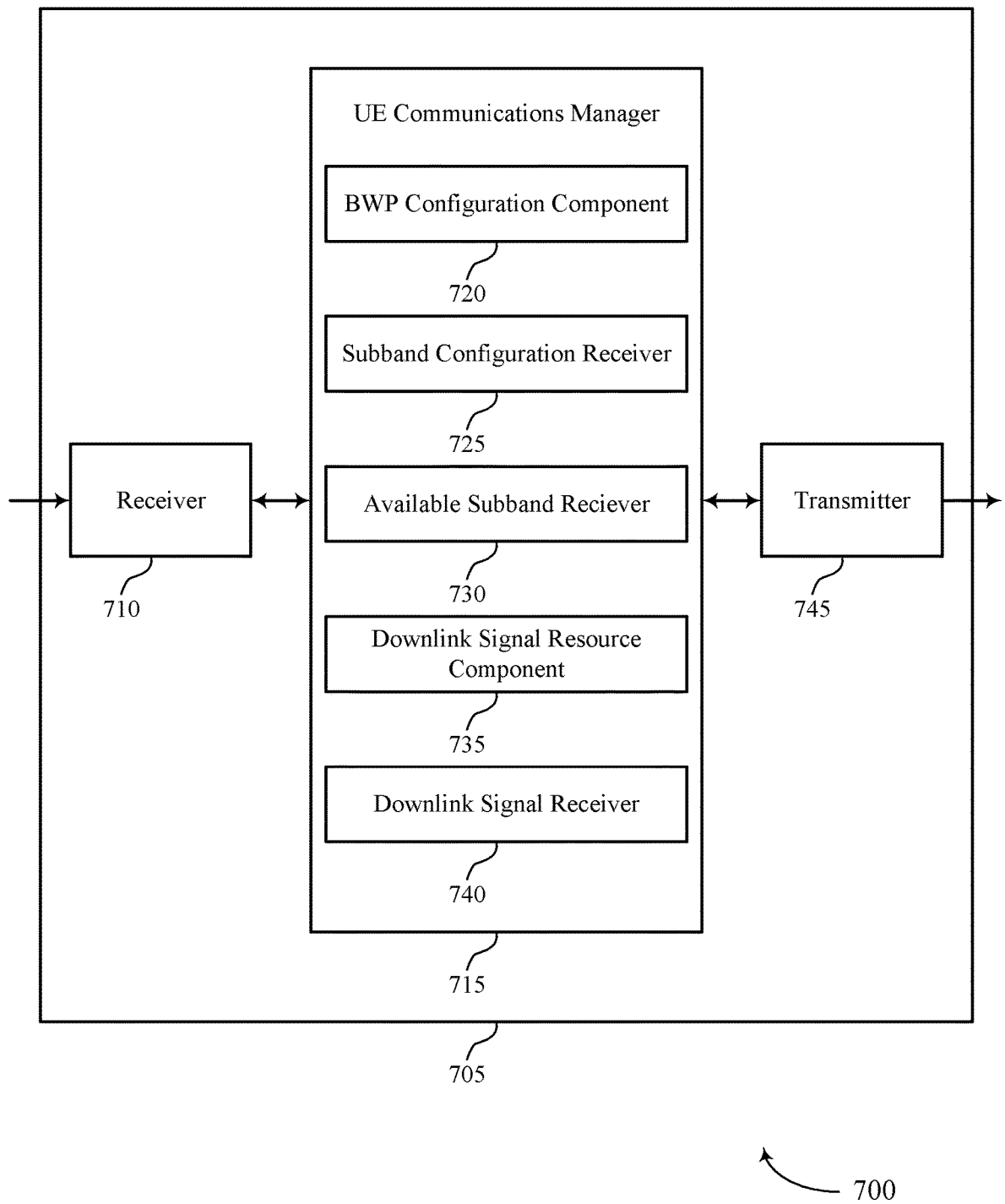

FIG. 7 shows a block diagram 700 of a device 705 that supports subband usage dependent downlink signals and channels in accordance with aspects of the present disclosure. The device 705 may be an example of aspects of a device 605, or a UE 115 as described herein. The device 705 may include a receiver 710, a UE communications manager 715, and a transmitter 745. The device 705 may also include one or more processors, memory coupled with the one or more processors, and instructions stored in the memory that are executable by the one or more processors to enable the one or more processors to perform the identifying of BWP configuration features discussed herein. Each of these components may be in communication with one another (e.g., via one or more buses).

The receiver 710 may receive information such as packets, user data, or control information associated with various information channels (e.g., control channels, data channels, and information related to subband usage dependent downlink signals and channels, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a BWP configuration component 720, a subband configuration receiver 725, an available subband receiver 730, a downlink signal resource component 735, and a downlink signal receiver 740. The UE communications manager 715 may be an example of aspects of the UE communications manager 910 described herein.

The BWP configuration component 720 may identify a BWP configuration for the UE, the BWP configuration indicating a set of frequency resources of a shared RF spectrum band.

The subband configuration receiver 725 may receive a resource configuration for the BWP, the resource configuration indicating a set of subbands for the BWP and time-frequency resources to be used by the UE to receive at least one downlink signal.

The available subband receiver 730 may receive, during a TxOP, an indication of at least one available subband of the set of subbands for the TxOP, the at least one available subband including a subset of the frequency resources.

The downlink signal resource component 735 may determine, based on the received resource configuration for the BWP and the received indication of the at least one available subband, a set of time-frequency resources of the at least one available subband for the at least one downlink signal.

The downlink signal receiver 740 may receive, during the TxOP, the at least one downlink signal according to the determined set of time-frequency resources.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

In some examples, the UE communications manager 715 may be implemented as an integrated circuit or chipset for a mobile device modem, and the receiver 710 and transmitter 745 may be implemented as analog components (e.g., amplifiers, filters, antennas) coupled with the mobile device modem to enable wireless transmission and reception over one or more bands.

The UE communications manager 715 as described herein may be implemented to realize one or more potential advantages. One implementation may allow the device 705 to receive a resource configuration, indicating at least one available subband of a plurality of subbands and time-frequency resources, and determine a set of time-frequency resources of the at least one available subband of a downlink signal. Communicating on the available subband may increase reliability and reduce latency during transmissions.

Based on techniques for determining a set of time-frequency resources of at least one available subband for a downlink signal as described herein, a processor of a UE 115 (e.g., controlling the receiver 710, the transmitter 745, or the transceiver 920 as described with reference to FIG. 9) may increase reliability, decrease power consumption, and decrease signaling overhead in the communication because the UE 115 may avoid going through unnecessary configuration processes during communications.

Figure 8:
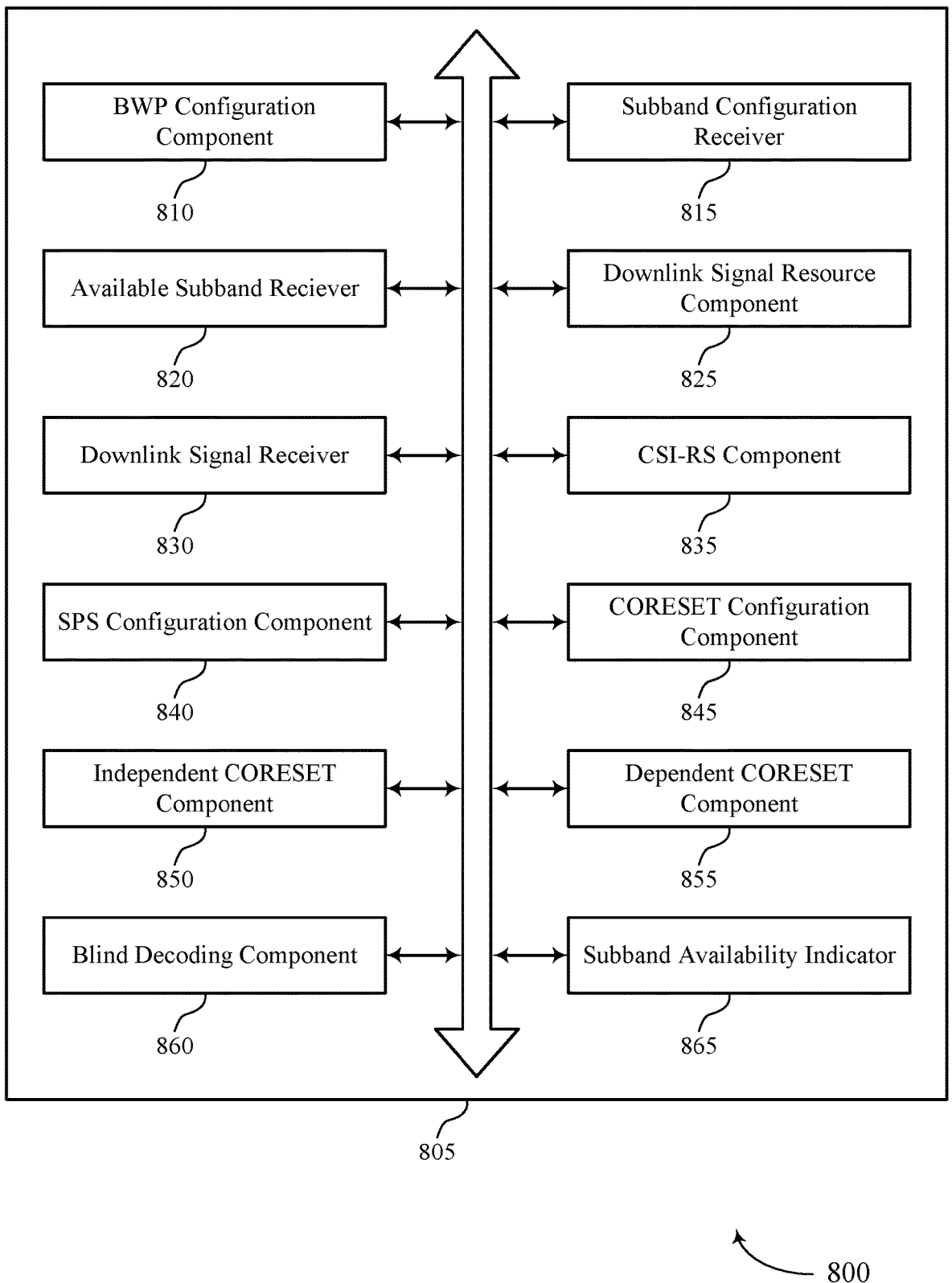
FIG. 8 shows a block diagram of a user equipment (UE) communications manager that supports subband usage dependent downlink signals and channels in accordance with aspects of the present disclosure.

FIG. 8 shows a block diagram 800 of a UE communications manager 805 that supports subband usage dependent downlink signals and channels in accordance with aspects of the present disclosure. The UE communications manager 805 may be an example of aspects of a UE communications manager 615, a UE communications manager 715, or a UE communications manager 910 described herein. The UE communications manager 805 may include a BWP configuration component 810, a subband configuration receiver 815, an available subband receiver 820, a downlink signal resource component 825, a downlink signal receiver 830, a CSI-RS component 835, a SPS configuration component 840, a CORESET configuration component 845, an independent CORESET component 850, a dependent CORESET component 855, a blind decoding component 860, and a subband availability indicator 865. Each of these modules may communicate, directly or indirectly, with one another (e.g., via one or more buses).

The BWP configuration component 810 may identify a BWP configuration for the UE, the BWP configuration indicating a set of frequency resources of a shared RF spectrum band.

The subband configuration receiver 815 may receive a resource configuration for the BWP, the resource configuration indicating a set of subbands for the BWP and time-frequency resources to be used by the UE to receive at least one downlink signal.

The available subband receiver 820 may receive, during a TxOP, an indication of at least one available subband of the set of subbands for the TxOP, the at least one available subband including a subset of the frequency resources.

The downlink signal resource component 825 may determine, based on the received resource configuration for the BWP and the received indication of the at least one available subband, a set of time-frequency resources of the at least one available subband for the at least one downlink signal.

The downlink signal receiver 830 may receive, during the TxOP, the at least one downlink signal according to the determined set of time-frequency resources.

The CSI-RS component 835 may determine, based on the received reference signal configuration and the received indication, resources of the at least one available subband to monitor for reference signals during the TxOP.

The SPS configuration component 840 may determine, based on the received SPS configuration and the received indication, resources within the at least one available subband to use to receive downlink data during the TxOP. In some examples, the SPS configuration component 840 may identify an intersection of the time-frequency resources indicated by the received resource configuration and the subset of the frequency resources and may determine, based on the identified intersection, the set of time-frequency resources within the at least one available subband for the at least one downlink signal.

In some cases, the received resource configuration may include an SPS configuration, the SPS configuration indicating a first transport block size different from a transport block size associated with the at least one downlink signal received by the UE according to the determined set of time-frequency resources. Additionally or alternatively, the received resource configuration includes an SPS configuration, where the at least one downlink signal is encoded using a same modulation and coding scheme as indicated by the SPS configuration.

The CORESET configuration component 845 may determine, based on the received CORESET configuration and the received indication, a set of control channel candidates for the at least one available subband during the TxOP.

The independent CORESET component 850 may identify, for the BWP, a set of control channel candidates indicated by the CORESET configuration. In some examples, the independent CORESET component 850 may determine the set of control channel candidates based on at least one of the identified set of control channel candidates being within the at least one available subband. Additionally, the independent CORESET component 850 may identify a control channel candidate for which at least a portion is outside the at least one available subband and may drop the identified control channel candidate.

The dependent CORESET component 855 may identify an intersection of a reference CORESET indicated by the received CORESET configuration and the indicated subband. In some examples, the dependent CORESET component 855 may determine the CORESET for the at least one available subband from the identified intersection. Additionally, the dependent CORESET component 855 may determine, based on the determined CORESET, the set of control channel candidates for the at least one available subband.

The blind decoding component 860 may attempt to decode, according to the determined set of control channel candidates, a control signal for the at least one available subband during the TxOP, the received at least one downlink signal including the control signal.

In some examples, the blind decoding component 860 may identify a set of search space sets for the at least one available subband, the set of search space sets including at least a first search space set and a second search space set, may determine whether a first number of control channel candidates of the first search space set exceeds a blind decoding threshold, may determine, based on the first search space set exceeding the blind decoding threshold, whether a second number of control channel candidates of the second search space set exceeds the blind decoding threshold, and may attempt to decode the control signal according to the second search space set based on the second search space set not exceeding the blind decoding threshold.

Additionally or alternatively, the blind decoding component 860 may identify a set of search space sets for the at least one available subband, each of the set of search space sets associated with an index value, may identify an offset for a search space set of the set of search space sets based on the index value associated with the search space set, and may attempt to decode the control signal according to the search space set and the identified offset. In some examples, the blind decoding component 860 may attempt to decode the control signal according to one or more of a set of search space sets, at least one of the set of search space sets including a UE specific search space set.

The subband availability indicator 865 may receive, in the at least one available subband, a control channel conveying the indication of the at least one available subband. In some cases, the control channel is a common control channel shared by a set of UEs.

Figure 9:
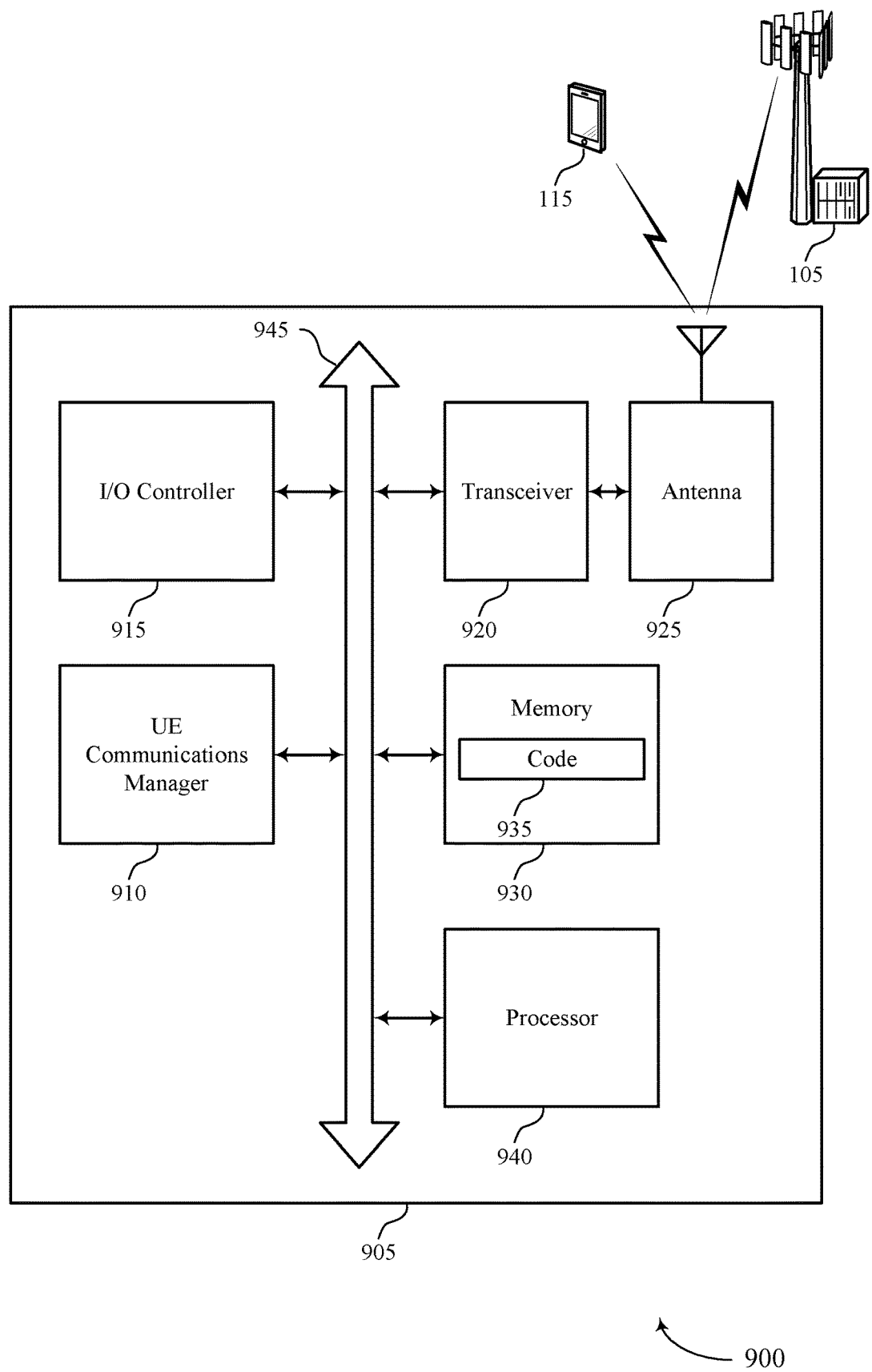
FIG. 9 shows a diagram of a system including a device that supports subband usage dependent downlink signals and channels in accordance with aspects of the present disclosure.

FIG. 9 shows a diagram of a system 900 including a device 905 that supports subband usage dependent downlink signals and channels in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may identify a BWP configuration for the UE, the BWP configuration indicating a set of frequency resources of a shared RF spectrum band. In some cases, the UE communications manager 910 may receive a resource configuration for the BWP, the resource configuration indicating a set of subbands for the BWP and time-frequency resources to be used by the UE to receive at least one downlink signal. Additionally, the UE communications manager 910 may receive, during a TxOP, an indication of at least one available subband of the set of subbands for the TxOP, the at least one available subband including a subset of the frequency resources. The UE communications manager 910 may determine, based on the received resource configuration for the BWP and the received indication of the at least one available subband, a set of time-frequency resources of the at least one available subband for the at least one downlink signal. In some cases, the UE communications manager 910 may receive, during the TxOP, the at least one downlink signal according to the determined set of time-frequency resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting subband usage dependent downlink signals and channels).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
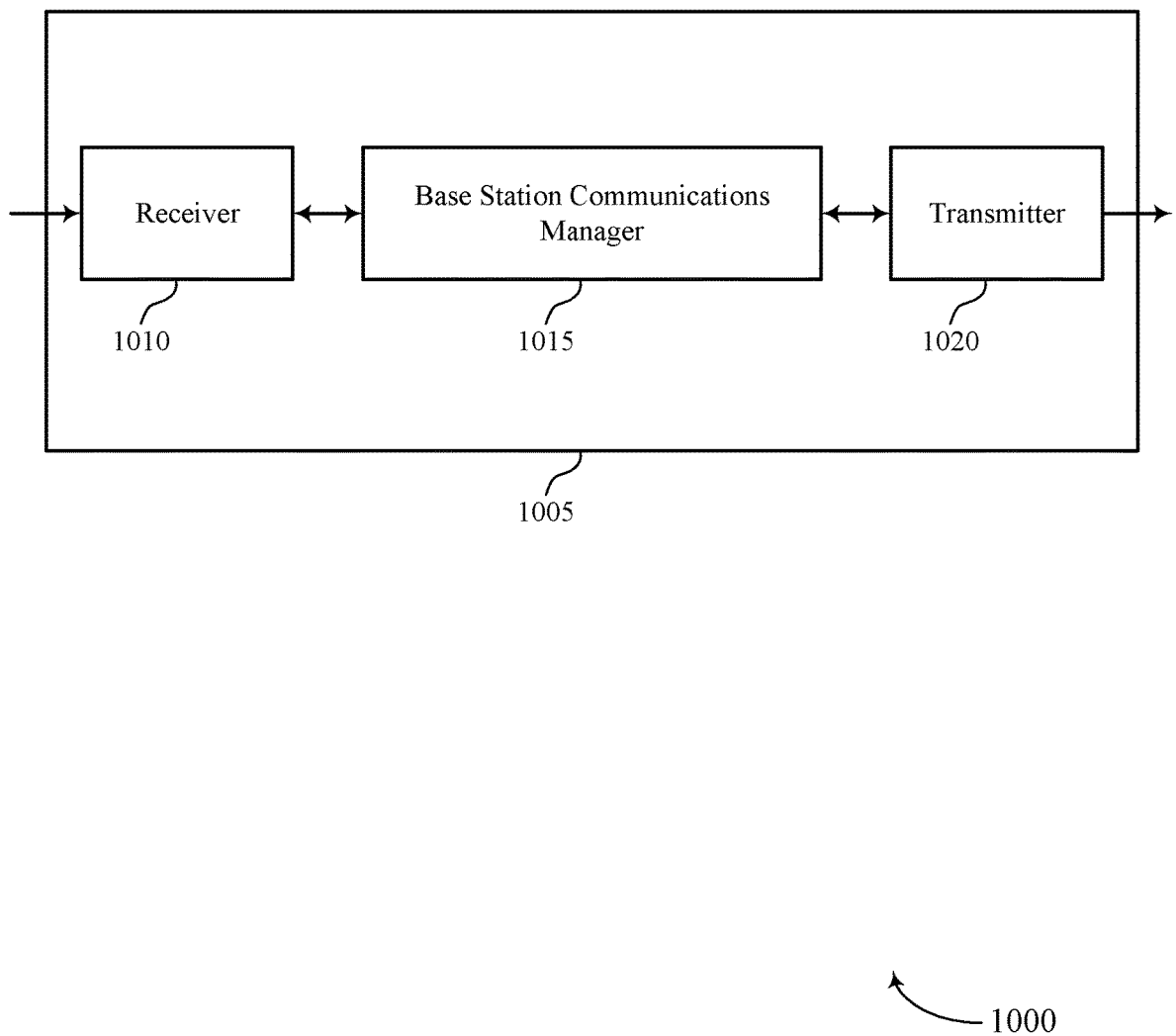
FIGS. 10 and 11 show block diagrams of devices that support subband usage dependent downlink signals and channels in accordance with aspects of the present disclosure.

FIG. 10 shows a block diagram 1000 of a device 1005 that supports subband usage dependent downlink signals and channels in accordance with aspects of the present disclosure. The device 1005 may be an example of aspects of a base station 105 as described herein. The device 1005 may include a receiver 1010, a base station communications manager 1015, and a transmitter 1020. The device 1005 may also include one or more processors, memory coupled with the one or more processors, and instructions stored in the memory that are executable by the one or more processors to enable the one or more processors to perform the identifying of BWP configuration features discussed herein. Each of these components may be in communication with one another (e.g., via one or more buses).

The receiver 1010 may receive information such as packets, user data, or control information associated with various information channels (e.g., control channels, data channels, and information related to subband usage dependent downlink signals and channels, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may identify a BWP configuration for a UE, the BWP configuration indicating a set of frequency resources of a shared RF spectrum band. In some cases, the base station communications manager 1015 may transmit, to the UE, a resource configuration for the BWP, the resource configuration indicating a set of subbands for the BWP and time-frequency resources to be used by the UE to receive at least one downlink signal. Additionally, the base station communications manager 1015 may transmit, during a TxOP, an indication of at least one available subband of the set of subbands for the TxOP, the at least one available subband including a subset of the frequency resources. The base station communications manager 1015 may determine, based on the transmitted resource configuration for the BWP and the transmitted indication of the at least one available subband, a set of time-frequency resources of the at least one available subband for the at least one downlink signal. In some cases, the base station communications manager 1015 may transmit, during the TxOP, the at least one downlink signal according to the determined set of time-frequency resources. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components, may be executed by a general-purpose processor, a DSP, an ASIC, a FPGA or other PLD, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
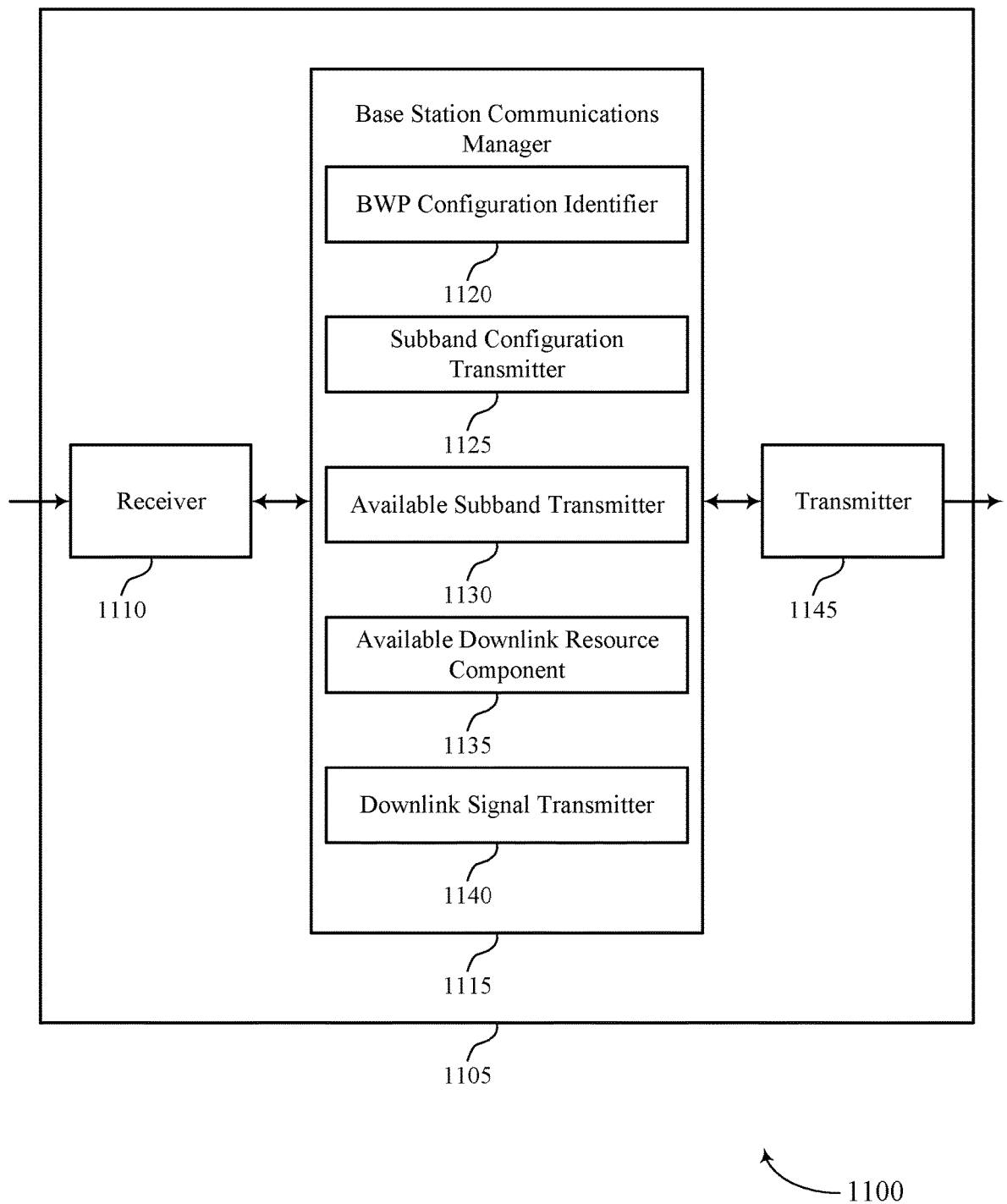

FIG. 11 shows a block diagram 1100 of a device 1105 that supports subband usage dependent downlink signals and channels in accordance with aspects of the present disclosure. The device 1105 may be an example of aspects of a device 1005, or a base station 105 as described herein. The device 1105 may include a receiver 1110, a base station communications manager 1115, and a transmitter 1145. The device 1105 may also include one or more processors, memory coupled with the one or more processors, and instructions stored in the memory that are executable by the one or more processors to enable the one or more processors to perform the identifying of BWP configuration features discussed herein. Each of these components may be in communication with one another (e.g., via one or more buses).

The receiver 1110 may receive information such as packets, user data, or control information associated with various information channels (e.g., control channels, data channels, and information related to subband usage dependent downlink signals and channels, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include a BWP configuration identifier 1120, a subband configuration transmitter 1125, an available subband transmitter 1130, an available downlink resource component 1135, and a downlink signal transmitter 1140. The base station communications manager 1115 may be an example of aspects of the base station communications manager 1310 described herein.

The BWP configuration identifier 1120 may identify a BWP configuration for a UE, the BWP configuration indicating a set of frequency resources of a shared RF spectrum band.

The subband configuration transmitter 1125 may transmit, to the UE, a resource configuration for the BWP, the resource configuration indicating a set of subbands for the BWP and time-frequency resources to be used by the UE to receive at least one downlink signal.

The available subband transmitter 1130 may transmit, during a TxOP, an indication of at least one available subband of the set of subbands for the TxOP, the at least one available subband including a subset of the frequency resources.

The available downlink resource component 1135 may determine, based on the transmitted resource configuration for the BWP and the transmitted indication of the at least one available subband, a set of time-frequency resources of the at least one available subband for the at least one downlink signal.

The downlink signal transmitter 1140 may transmit, during the TxOP, the at least one downlink signal according to the determined set of time-frequency resources.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
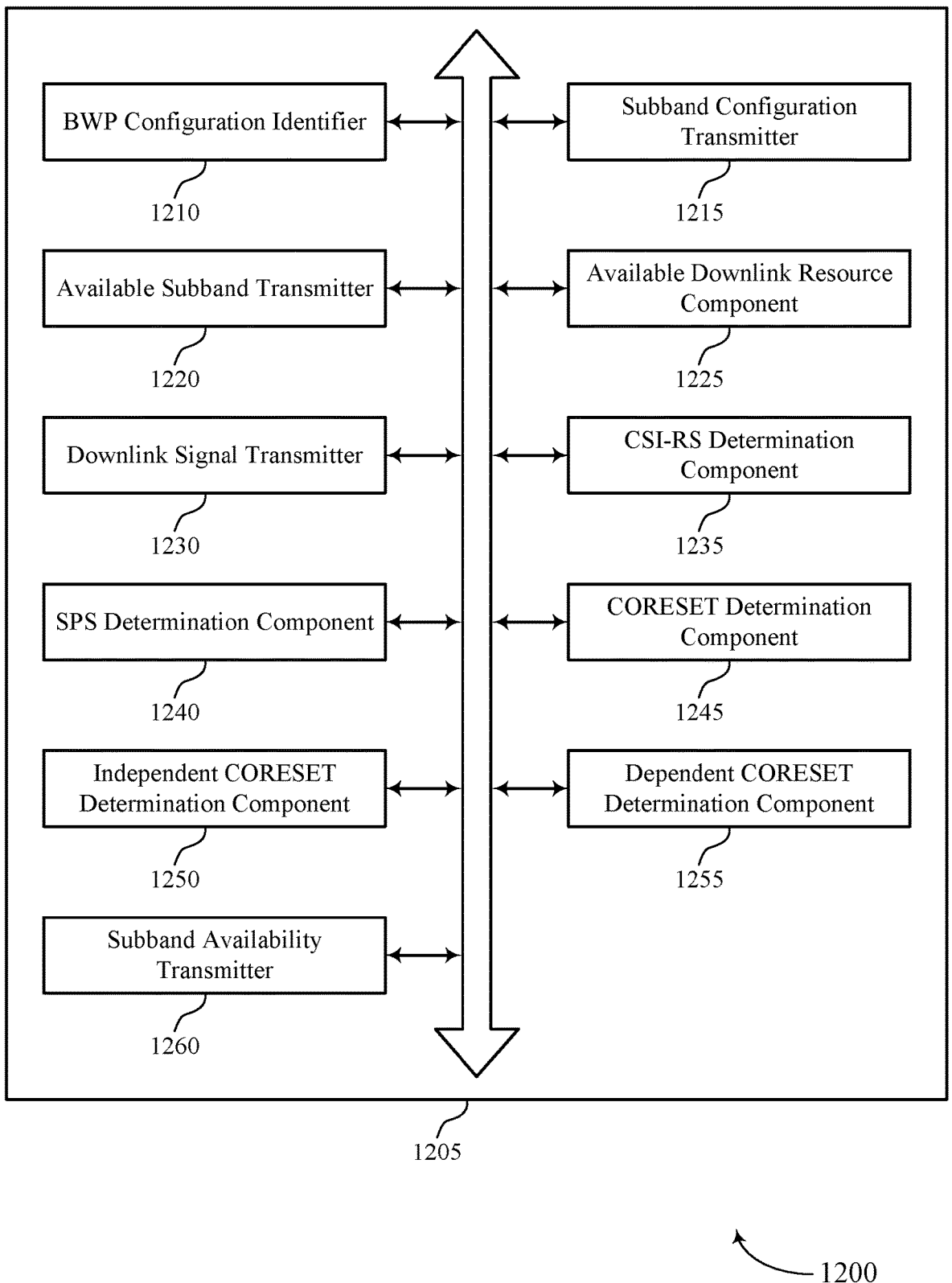
FIG. 12 shows a block diagram of a base station communications manager that supports subband usage dependent downlink signals and channels in accordance with aspects of the present disclosure.

FIG. 12 shows a block diagram 1200 of a base station communications manager 1205 that supports subband usage dependent downlink signals and channels in accordance with aspects of the present disclosure. The base station communications manager 1205 may be an example of aspects of a base station communications manager 1015, a base station communications manager 1115, or a base station communications manager 1310 described herein. The base station communications manager 1205 may include a BWP configuration identifier 1210, a subband configuration transmitter 1215, an available subband transmitter 1220, an available downlink resource component 1225, a downlink signal transmitter 1230, a CSI-RS determination component 1235, a SPS determination component 1240, a CORESET determination component 1245, an independent CORESET determination component 1250, a dependent CORESET determination component 1255, and a subband availability transmitter 1260. Each of these modules may communicate, directly or indirectly, with one another (e.g., via one or more buses).

The BWP configuration identifier 1210 may identify a BWP configuration for a UE, the BWP configuration indicating a set of frequency resources of a shared RF spectrum band.

The subband configuration transmitter 1215 may transmit, to the UE, a resource configuration for the BWP, the resource configuration indicating a set of subbands for the BWP and time-frequency resources to be used by the UE to receive at least one downlink signal.

The available subband transmitter 1220 may transmit, during a TxOP, an indication of at least one available subband of the set of subbands for the TxOP, the at least one available subband including a subset of the frequency resources.

The available downlink resource component 1225 may determine, based on the transmitted resource configuration for the BWP and the transmitted indication of the at least one available subband, a set of time-frequency resources of the at least one available subband for the at least one downlink signal.

The downlink signal transmitter 1230 may transmit, during the TxOP, the at least one downlink signal according to the determined set of time-frequency resources.

The CSI-RS determination component 1235 may determine, based on the transmitted reference signal configuration and the transmitted indication, resources of the at least one available subband to use to transmit reference signals during the TxOP.

The SPS determination component 1240 may determine, based on the transmitted SPS configuration and the transmitted indication, resources within the at least one available subband to use to transmit downlink data for the UE during the TxOP. In some examples, the SPS determination component 1240 may identify an intersection of the time-frequency resources indicated by the transmitted resource configuration and the subset of the frequency resources. Additionally, the SPS determination component 1240 may determine, based on the identified intersection, the set of time-frequency resources within the at least one available subband for the at least one downlink signal. In some cases, the transmitted resource configuration may include an SPS configuration, the SPS configuration indicating a first transport block size different from a transport block size associated with the at least one downlink signal received by the UE according to the determined set of time-frequency resources. Additionally or alternatively, the transmitted resource configuration may include an SPS configuration, where the at least one downlink signal is encoded using a same modulation and coding scheme as indicated by the SPS configuration.

The CORESET determination component 1245 may determine, based on the transmitted CORESET configuration and the transmitted indication, a set of control channel candidates to be used by the UE for the at least one available subband during the TxOP.

The independent CORESET determination component 1250 may identify, for the BWP, a set of control channel candidates indicated by the CORESET configuration. In some examples, the independent CORESET determination component 1250 may determine the set of control channel candidates based on at least one of the identified set of control channel candidates being within the indicated available subband. Additionally, the independent CORESET determination component 1250 may identify a control channel candidate for which at least a portion is outside the at least one available subband and may drop the identified control channel candidate.

The dependent CORESET determination component 1255 may identify an intersection of a reference CORESET indicated by the received CORESET configuration and the indicated subband. In some examples, the dependent CORESET determination component 1255 may determine the CORESET for the at least one available subband from the identified intersection. In some examples, the dependent CORESET determination component 1255 may determine, based on the determined CORESET, the set of control channel candidates for the at least one available subband.

The subband availability transmitter 1260 may transmit, in the at least one available subband, a control channel conveying the indication of the at least one available subband. In some cases, the control channel is a common control channel shared by a set of UEs.

Figure 13:
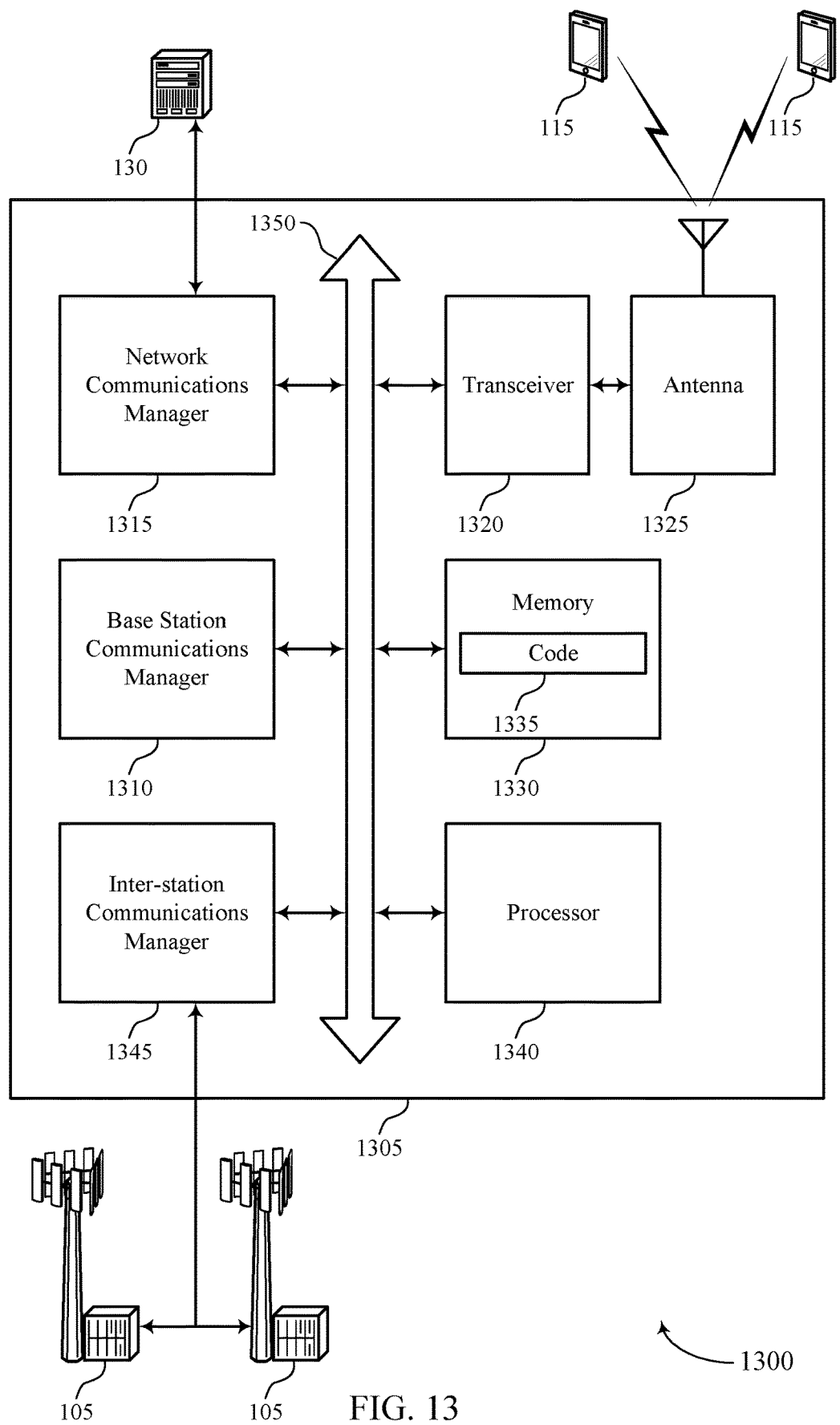
FIG. 13 shows a diagram of a system including a device that supports subband usage dependent downlink signals and channels in accordance with aspects of the present disclosure.

FIG. 13 shows a diagram of a system 1300 including a device 1305 that supports subband usage dependent downlink signals and channels in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may identify a BWP configuration for a UE, the BWP configuration indicating a set of frequency resources of a shared RF spectrum band. In some cases, the base station communications manager 1310 may transmit, to the UE, a resource configuration for the BWP, the resource configuration indicating a set of subbands for the BWP and time-frequency resources to be used by the UE to receive at least one downlink signal. Additionally, the base station communications manager 1310 may transmit, during a TxOP, an indication of at least one available subband of the set of subbands for the TxOP, the at least one available subband including a subset of the frequency resources. The base station communications manager 1310 may determine, based on the transmitted resource configuration for the BWP and the transmitted indication of the at least one available subband, a set of time-frequency resources of the at least one available subband for the at least one downlink signal. Additionally, the base station communications manager 1310 may transmit, during the TxOP, the at least one downlink signal according to the determined set of time-frequency resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting subband usage dependent downlink signals and channels).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
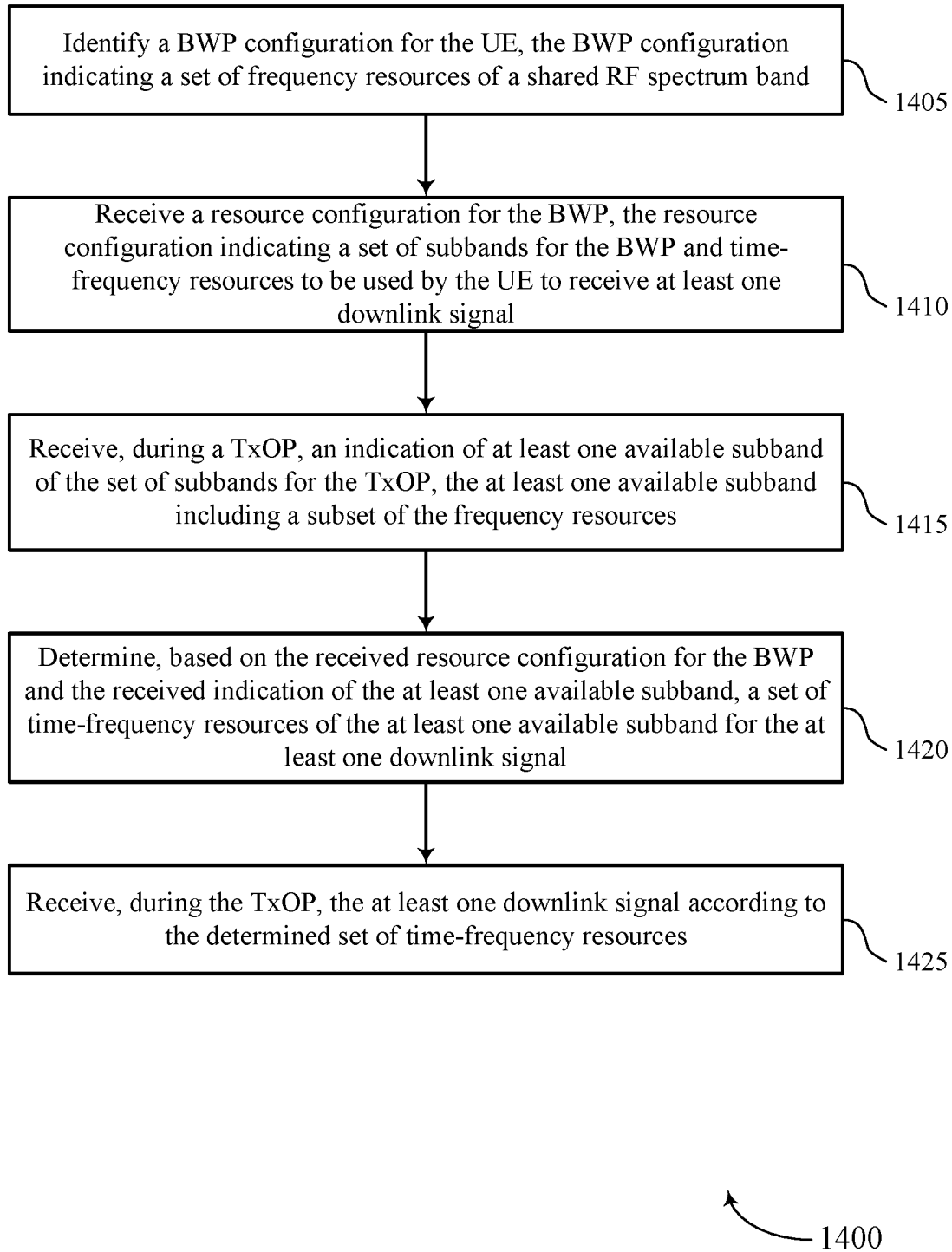
FIGS. 14 through 19 show flowcharts illustrating methods that support subband usage dependent downlink signals and channels in accordance with aspects of the present disclosure.

FIG. 14 shows a flowchart illustrating a method 1400 that supports subband usage dependent downlink signals and channels in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a BWP configuration for the UE, the BWP configuration indicating a set of frequency resources of a shared RF spectrum band. The operations of 1405 may be performed according to the methods described herein. In some examples, aspects of the operations of 1405 may be performed by a BWP configuration component as described with reference to FIGS. 6 through 9.

At 1410, the UE may receive a resource configuration for the BWP, the resource configuration indicating a set of subbands for the BWP and time-frequency resources to be used by the UE to receive at least one downlink signal. The operations of 1410 may be performed according to the methods described herein. In some examples, aspects of the operations of 1410 may be performed by a subband configuration receiver as described with reference to FIGS. 6 through 9.

At 1415, the UE may receive, during a TxOP, an indication of at least one available subband of the set of subbands for the TxOP, the at least one available subband including a subset of the frequency resources. The operations of 1415 may be performed according to the methods described herein. In some examples, aspects of the operations of 1415 may be performed by an available subband receiver as described with reference to FIGS. 6 through 9.

At 1420, the UE may determine, based on the received resource configuration for the BWP and the received indication of the at least one available subband, a set of time-frequency resources of the at least one available subband for the at least one downlink signal. The operations of 1420 may be performed according to the methods described herein. In some examples, aspects of the operations of 1420 may be performed by a downlink signal resource component as described with reference to FIGS. 6 through 9.

At 1425, the UE may receive, during the TxOP, the at least one downlink signal according to the determined set of time-frequency resources. The operations of 1425 may be performed according to the methods described herein. In some examples, aspects of the operations of 1425 may be performed by a downlink signal receiver as described with reference to FIGS. 6 through 9.

Figure 15:
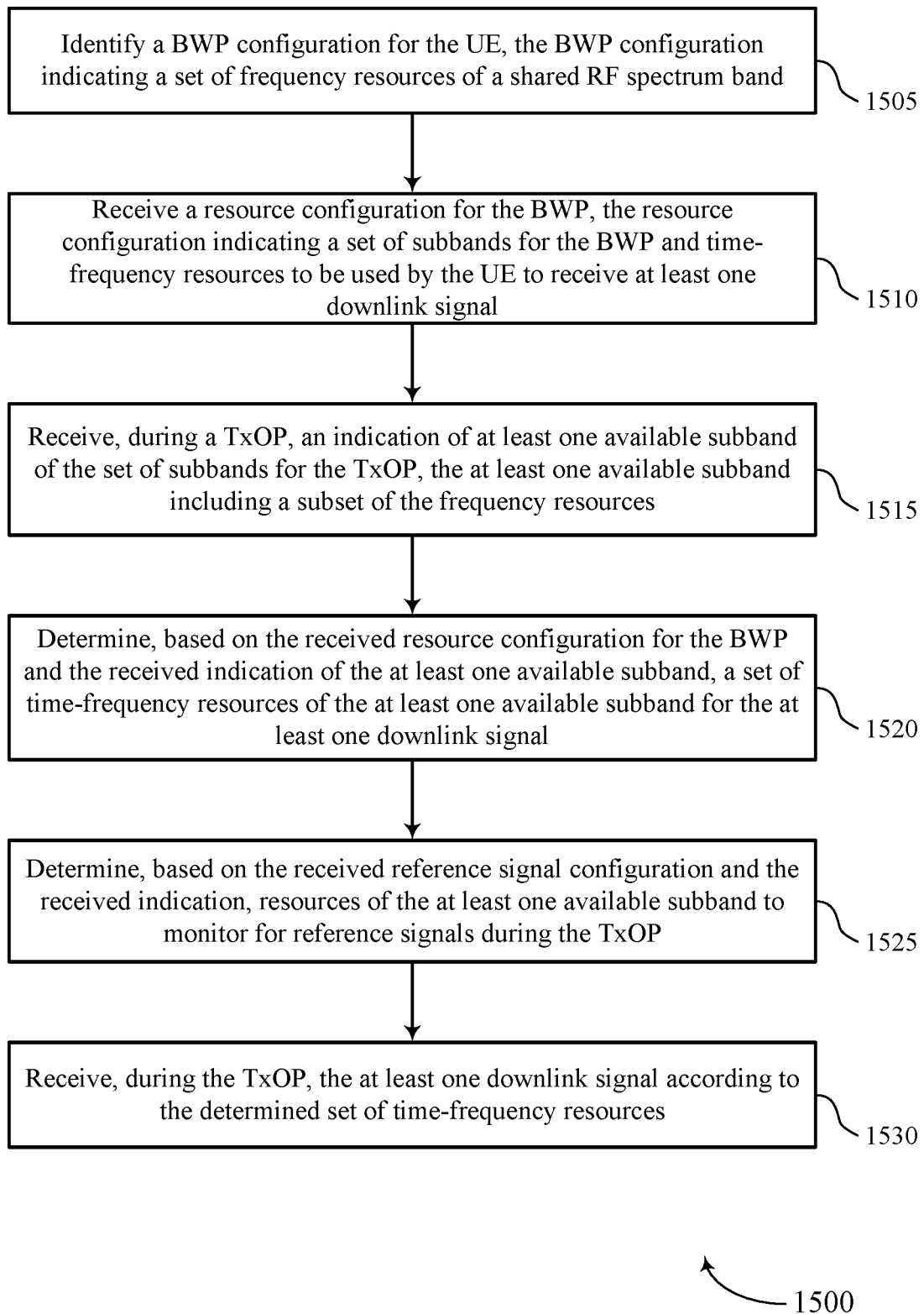

FIG. 15 shows a flowchart illustrating a method 1500 that supports subband usage dependent downlink signals and channels in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a BWP configuration for the UE, the BWP configuration indicating a set of frequency resources of a shared RF spectrum band. The operations of 1505 may be performed according to the methods described herein. In some examples, aspects of the operations of 1505 may be performed by a BWP configuration component as described with reference to FIGS. 6 through 9.

At 1510, the UE may receive a resource configuration for the BWP, the resource configuration indicating a set of subbands for the BWP and time-frequency resources to be used by the UE to receive at least one downlink signal. The operations of 1510 may be performed according to the methods described herein. In some examples, aspects of the operations of 1510 may be performed by a subband configuration receiver as described with reference to FIGS. 6 through 9.

At 1515, the UE may receive, during a TxOP, an indication of at least one available subband of the set of subbands for the TxOP, the at least one available subband including a subset of the frequency resources. The operations of 1515 may be performed according to the methods described herein. In some examples, aspects of the operations of 1515 may be performed by an available subband receiver as described with reference to FIGS. 6 through 9.

At 1520, the UE may determine, based on the received resource configuration for the BWP and the received indication of the at least one available subband, a set of time-frequency resources of the at least one available subband for the at least one downlink signal. The operations of 1520 may be performed according to the methods described herein. In some examples, aspects of the operations of 1520 may be performed by a downlink signal resource component as described with reference to FIGS. 6 through 9.

At 1525, the UE may determine, based on the received reference signal configuration and the received indication, resources of the at least one available subband to monitor for reference signals during the TxOP. The operations of 1525 may be performed according to the methods described herein. In some examples, aspects of the operations of 1525 may be performed by a CSI-RS component as described with reference to FIGS. 6 through 9.

At 1530, the UE may receive, during the TxOP, the at least one downlink signal according to the determined set of time-frequency resources. The operations of 1530 may be performed according to the methods described herein. In some examples, aspects of the operations of 1530 may be performed by a downlink signal receiver as described with reference to FIGS. 6 through 9.

Figure 16:
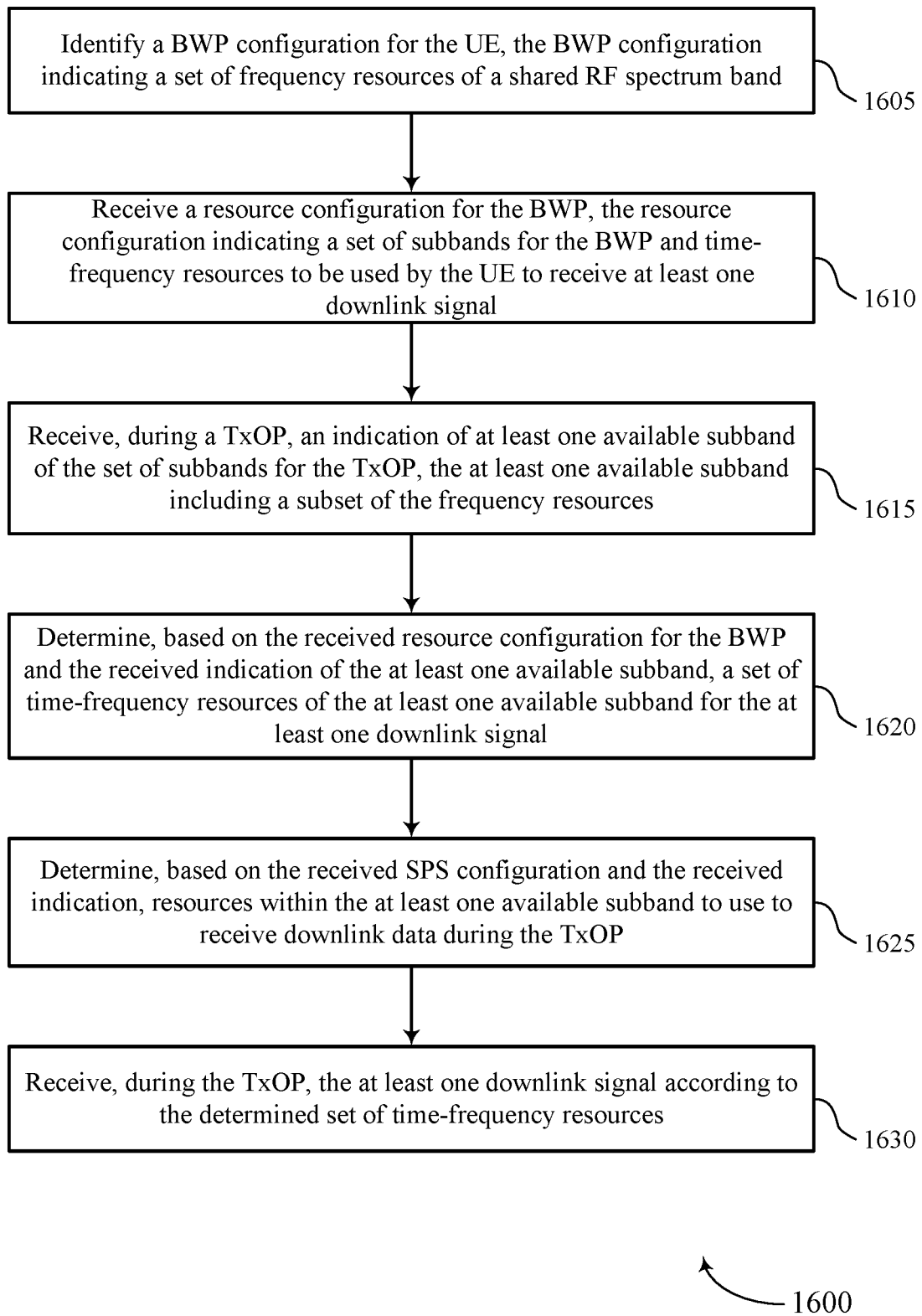

FIG. 16 shows a flowchart illustrating a method 1600 that supports subband usage dependent downlink signals and channels in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a BWP configuration for the UE, the BWP configuration indicating a set of frequency resources of a shared RF spectrum band. The operations of 1605 may be performed according to the methods described herein. In some examples, aspects of the operations of 1605 may be performed by a BWP configuration component as described with reference to FIGS. 6 through 9.

At 1610, the UE may receive a resource configuration for the BWP, the resource configuration indicating a set of subbands for the BWP and time-frequency resources to be used by the UE to receive at least one downlink signal. The operations of 1610 may be performed according to the methods described herein. In some examples, aspects of the operations of 1610 may be performed by a subband configuration receiver as described with reference to FIGS. 6 through 9.

At 1615, the UE may receive, during a TxOP, an indication of at least one available subband of the set of subbands for the TxOP, the at least one available subband including a subset of the frequency resources. The operations of 1615 may be performed according to the methods described herein. In some examples, aspects of the operations of 1615 may be performed by an available subband receiver as described with reference to FIGS. 6 through 9.

At 1620, the UE may determine, based on the received resource configuration for the BWP and the received indication of the at least one available subband, a set of time-frequency resources of the at least one available subband for the at least one downlink signal. The operations of 1620 may be performed according to the methods described herein. In some examples, aspects of the operations of 1620 may be performed by a downlink signal resource component as described with reference to FIGS. 6 through 9.

At 1625, the UE may determine, based on the received SPS configuration and the received indication, resources within the at least one available subband to use to receive downlink data during the TxOP. The operations of 1625 may be performed according to the methods described herein. In some examples, aspects of the operations of 1625 may be performed by a SPS configuration component as described with reference to FIGS. 6 through 9.

At 1630, the UE may receive, during the TxOP, the at least one downlink signal according to the determined set of time-frequency resources. The operations of 1630 may be performed according to the methods described herein. In some examples, aspects of the operations of 1630 may be performed by a downlink signal receiver as described with reference to FIGS. 6 through 9.

Figure 17:
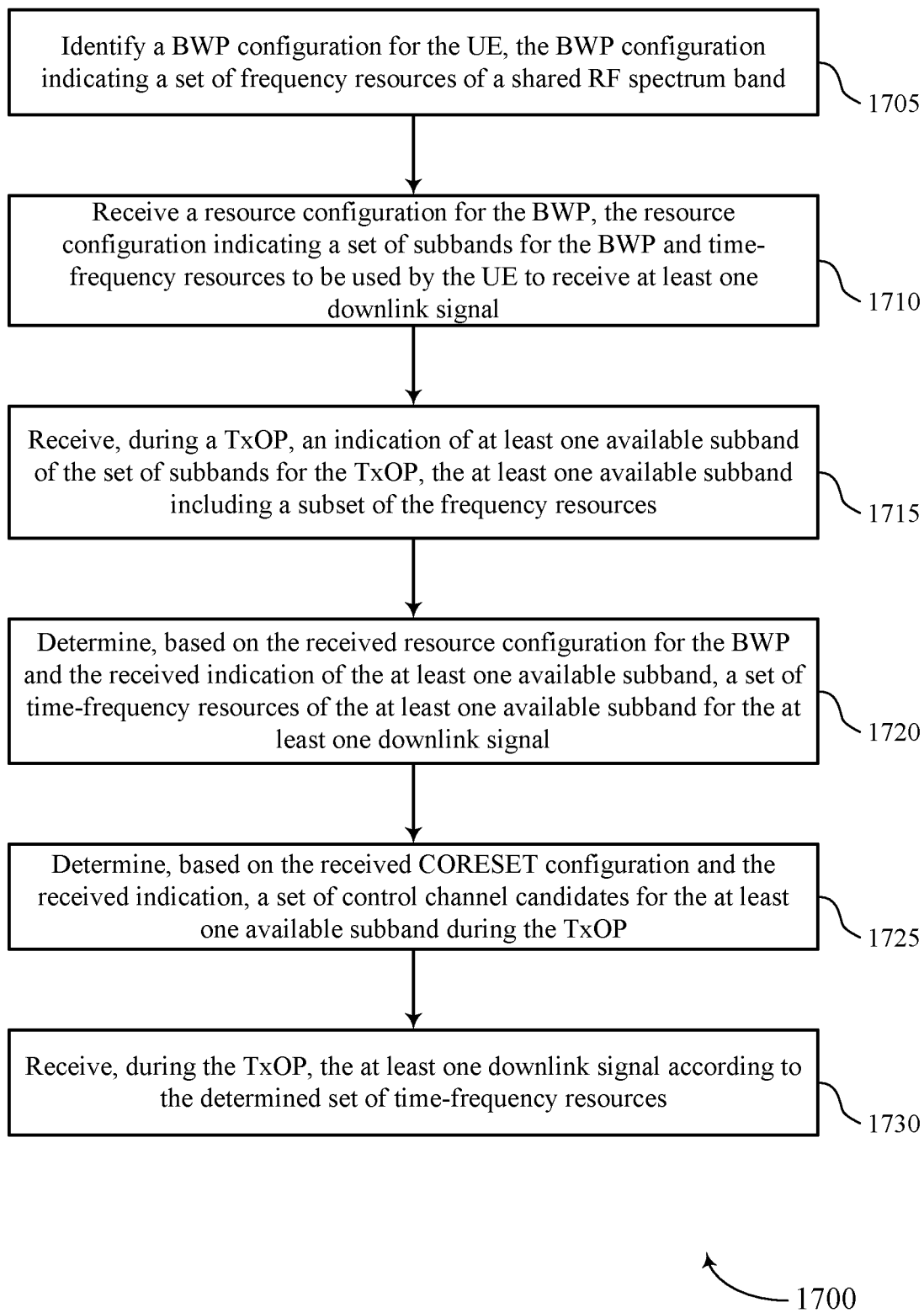

FIG. 17 shows a flowchart illustrating a method 1700 that supports subband usage dependent downlink signals and channels in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may identify a BWP configuration for the UE, the BWP configuration indicating a set of frequency resources of a shared RF spectrum band. The operations of 1705 may be performed according to the methods described herein. In some examples, aspects of the operations of 1705 may be performed by a BWP configuration component as described with reference to FIGS. 6 through 9.

At 1710, the UE may receive a resource configuration for the BWP, the resource configuration indicating a set of subbands for the BWP and time-frequency resources to be used by the UE to receive at least one downlink signal. The operations of 1710 may be performed according to the methods described herein. In some examples, aspects of the operations of 1710 may be performed by a subband configuration receiver as described with reference to FIGS. 6 through 9.

At 1715, the UE may receive, during a TxOP, an indication of at least one available subband of the set of subbands for the TxOP, the at least one available subband including a subset of the frequency resources. The operations of 1715 may be performed according to the methods described herein. In some examples, aspects of the operations of 1715 may be performed by an available subband receiver as described with reference to FIGS. 6 through 9.

At 1720, the UE may determine, based on the received resource configuration for the BWP and the received indication of the at least one available subband, a set of time-frequency resources of the at least one available subband for the at least one downlink signal. The operations of 1720 may be performed according to the methods described herein. In some examples, aspects of the operations of 1720 may be performed by a downlink signal resource component as described with reference to FIGS. 6 through 9.

At 1725, the UE may determine, based on the received CORESET configuration and the received indication, a set of control channel candidates for the at least one available subband during the TxOP. The operations of 1725 may be performed according to the methods described herein. In some examples, aspects of the operations of 1725 may be performed by a CORESET configuration component as described with reference to FIGS. 6 through 9.

At 1730, the UE may receive, during the TxOP, the at least one downlink signal according to the determined set of time-frequency resources. The operations of 1730 may be performed according to the methods described herein. In some examples, aspects of the operations of 1730 may be performed by a downlink signal receiver as described with reference to FIGS. 6 through 9.

Figure 18:
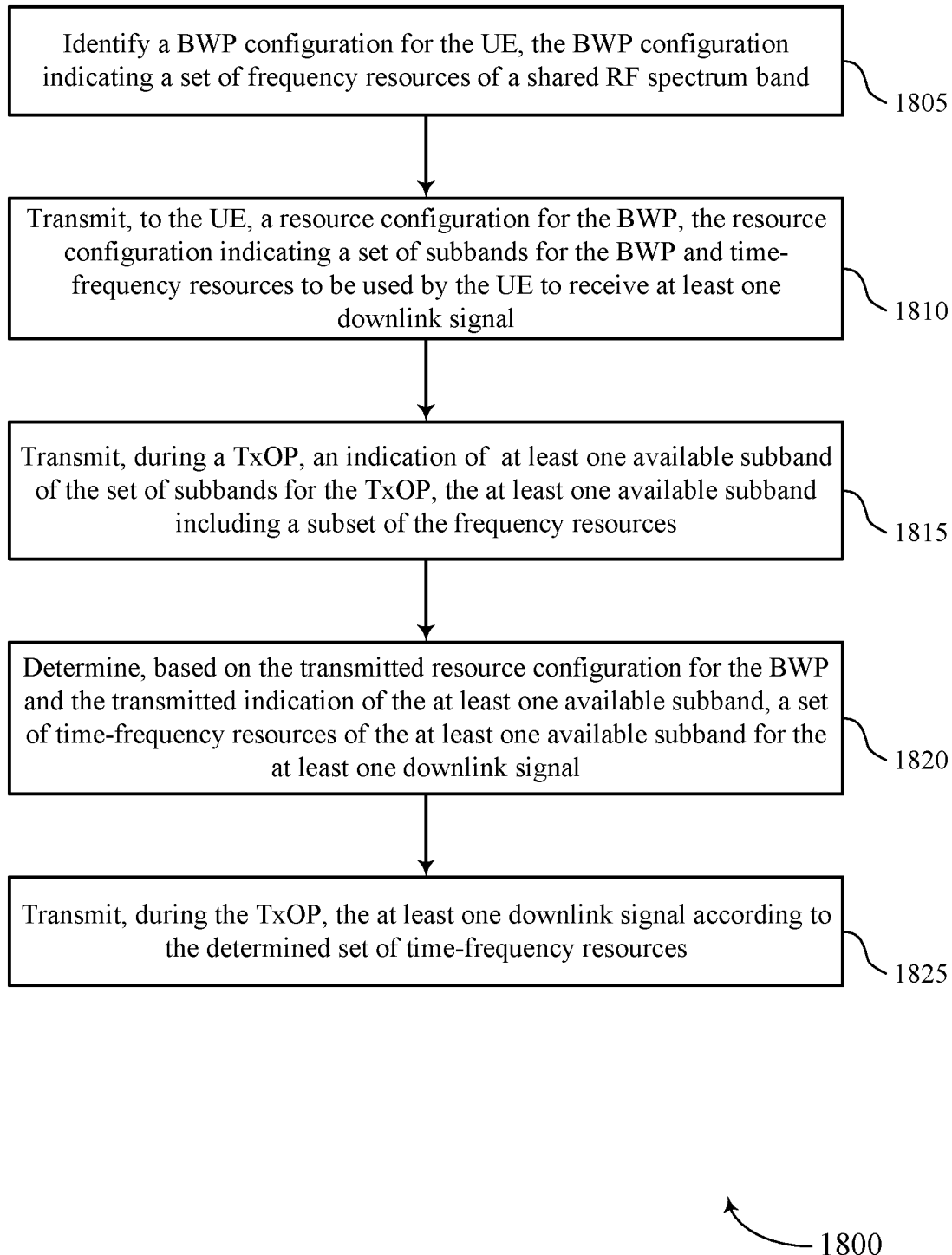

FIG. 18 shows a flowchart illustrating a method 1800 that supports subband usage dependent downlink signals and channels in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a BWP configuration for a UE, the BWP configuration indicating a set of frequency resources of a shared RF spectrum band. The operations of 1805 may be performed according to the methods described herein. In some examples, aspects of the operations of 1805 may be performed by a BWP configuration identifier as described with reference to FIGS. 10 through 13.

At 1810, the base station may transmit, to the UE, a resource configuration for the BWP, the resource configuration indicating a set of subbands for the BWP and time-frequency resources to be used by the UE to receive at least one downlink signal. The operations of 1810 may be performed according to the methods described herein. In some examples, aspects of the operations of 1810 may be performed by a subband configuration transmitter as described with reference to FIGS. 10 through 13.

At 1815, the base station may transmit, during a TxOP, an indication of at least one available subband of the set of subbands for the TxOP, the at least one available subband including a subset of the frequency resources. The operations of 1815 may be performed according to the methods described herein. In some examples, aspects of the operations of 1815 may be performed by an available subband transmitter as described with reference to FIGS. 10 through 13.

At 1820, the base station may determine, based on the transmitted resource configuration for the BWP and the transmitted indication of the at least one available subband, a set of time-frequency resources of the at least one available subband for the at least one downlink signal. The operations of 1820 may be performed according to the methods described herein. In some examples, aspects of the operations of 1820 may be performed by an available downlink resource component as described with reference to FIGS. 10 through 13.

At 1825, the base station may transmit, during the TxOP, the at least one downlink signal according to the determined set of time-frequency resources. The operations of 1825 may be performed according to the methods described herein. In some examples, aspects of the operations of 1825 may be performed by a downlink signal transmitter as described with reference to FIGS. 10 through 13.

Figure 19:
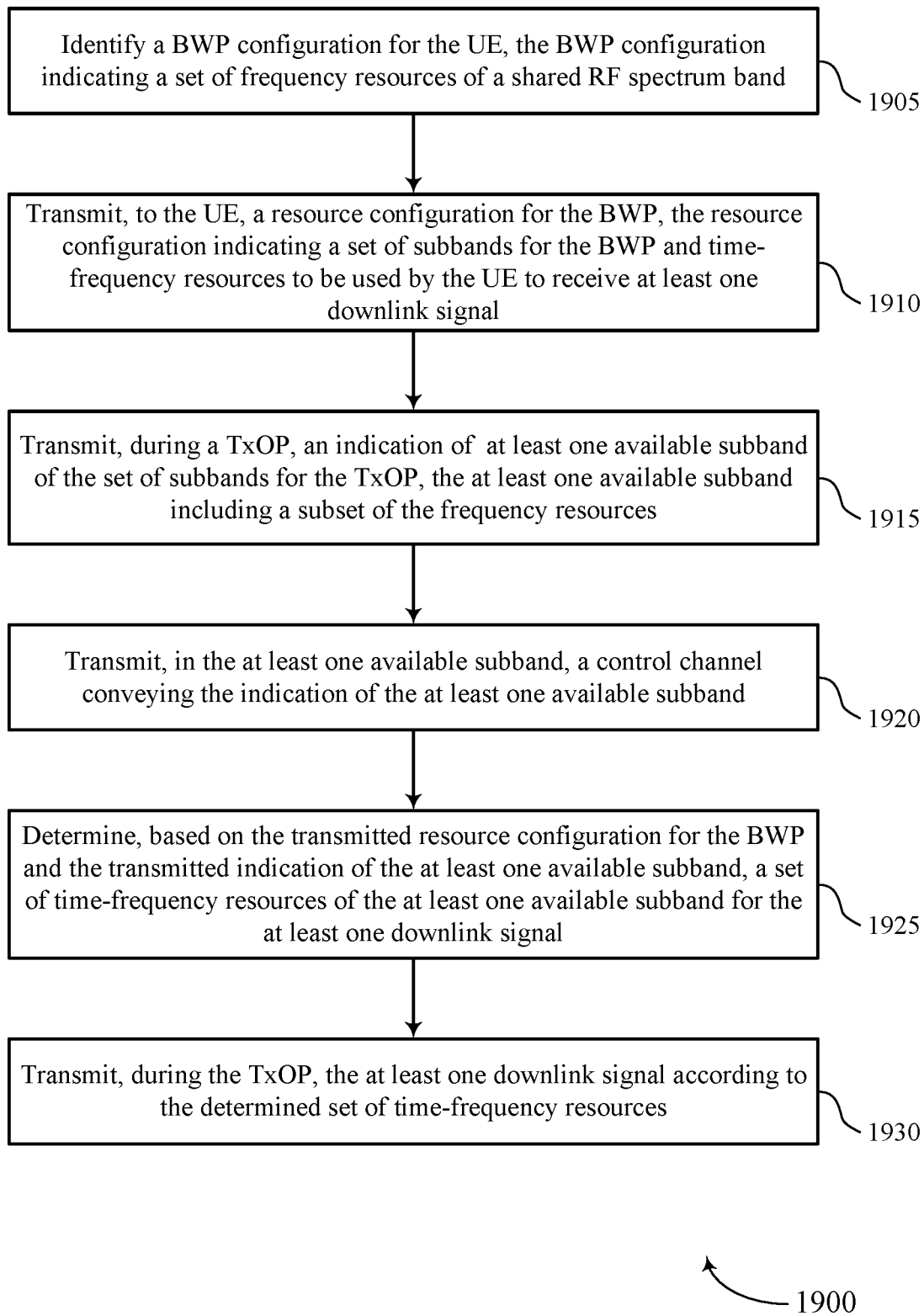

FIG. 19 shows a flowchart illustrating a method 1900 that supports subband usage dependent downlink signals and channels in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may identify a BWP configuration for a UE, the BWP configuration indicating a set of frequency resources of a shared RF spectrum band. The operations of 1905 may be performed according to the methods described herein. In some examples, aspects of the operations of 1905 may be performed by a BWP configuration identifier as described with reference to FIGS. 10 through 13.

At 1910, the base station may transmit, to the UE, a resource configuration for the BWP, the resource configuration indicating a set of subbands for the BWP and time-frequency resources to be used by the UE to receive at least one downlink signal. The operations of 1910 may be performed according to the methods described herein. In some examples, aspects of the operations of 1910 may be performed by a subband configuration transmitter as described with reference to FIGS. 10 through 13.

At 1915, the base station may transmit, during a TxOP, an indication of at least one available subband of the set of subbands for the TxOP, the at least one available subband including a subset of the frequency resources. The operations of 1915 may be performed according to the methods described herein. In some examples, aspects of the operations of 1915 may be performed by an available subband transmitter as described with reference to FIGS. 10 through 13.

At 1920, the base station may transmit, in the at least one available subband, a control channel conveying the indication of the at least one available subband. The operations of 1920 may be performed according to the methods described herein. In some examples, aspects of the operations of 1920 may be performed by a subband availability transmitter as described with reference to FIGS. 10 through 13.

At 1925, the base station may determine, based on the transmitted resource configuration for the BWP and the transmitted indication of the at least one available subband, a set of time-frequency resources of the at least one available subband for the at least one downlink signal. The operations of 1925 may be performed according to the methods described herein. In some examples, aspects of the operations of 1925 may be performed by an available downlink resource component as described with reference to FIGS. 10 through 13.

At 1930, the base station may transmit, during the TxOP, the at least one downlink signal according to the determined set of time-frequency resources. The operations of 1930 may be performed according to the methods described herein. In some examples, aspects of the operations of 1930 may be performed by a downlink signal transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying a bandwidth part configuration for the UE, the bandwidth part configuration indicating a set of frequency resources of a shared radio frequency (RF) spectrum band;
    receiving a resource configuration for a bandwidth part, the resource configuration indicating a plurality of subbands for the bandwidth part, at least one guard band between a first subband of the plurality of subbands and a second subband of the plurality of subbands, and a plurality of time-frequency resources;
    receiving, during a transmission opportunity, an indication of at least one available subband of the plurality of subbands for the transmission opportunity, the at least one available subband comprising a subset of the set of frequency resources, wherein the subset of the set of frequency resources comprises the first subband, the second subband, or any combination thereof;
    determining, based at least in part on the received resource configuration for the bandwidth part and the received indication of the at least one available subband, a set of time-frequency resources of the at least one available subband for at least one downlink signal, wherein the plurality of time-frequency resources comprise the set of time-frequency resources;
    identifying a plurality of search space sets for the at least one available subband, each of the plurality of search space sets associated with an index value;
    identifying an offset for a search space set of the plurality of search space sets based at least in part on the index value associated with the search space set; and
    receiving, during the transmission opportunity, the at least one downlink signal according to the determined set of time-frequency resources, the identified plurality of search space sets, and the identified offset.

2. The method of claim 1, wherein the resource configuration comprises a reference signal configuration for the bandwidth part, and wherein determining the set of time-frequency resources of the at least one available subband comprises:
    determining, based at least in part on the received reference signal configuration and the received indication, resources of the at least one available subband to monitor for reference signals during the transmission opportunity.

3. The method of claim 1, wherein the resource configuration comprises a semi-persistent scheduling configuration for the bandwidth part, and wherein determining the set of time-frequency resources of the at least one available subband comprises:
    determining, based at least in part on the received semi-persistent scheduling configuration and the received indication, resources within the at least one available subband to use to receive downlink data during the transmission opportunity.

4. The method of claim 1, wherein the resource configuration comprises a control resource set configuration for the bandwidth part, and wherein determining the set of time-frequency resources of the at least one available subband comprises:
    determining, based at least in part on the received control resource set configuration and the received indication, a set of control channel candidates for the at least one available subband during the transmission opportunity.

5. The method of claim 4, wherein determining the set of control channel candidates for the at least one available subband comprises:
    identifying, for the bandwidth part, a plurality of control channel candidates indicated by the control resource set configuration; and
    determining the set of control channel candidates based at least in part on at least one of the identified plurality of control channel candidates being within the at least one available subband.

6. The method of claim 5, wherein determining the set of control channel candidates further comprises:
    identifying a control channel candidate for which at least a portion is outside the at least one available subband; and
    dropping the identified control channel candidate.

7. The method of claim 4, wherein determining the set of control channel candidates for the at least one available subband comprises:
    identifying an intersection of a reference control resource set indicated by the received control resource set configuration and the at least one available subband;
    determining a control resource set for the at least one available subband from the identified intersection; and
    determining, based at least in part on the determined control resource set, the set of control channel candidates for the at least one available subband.

8. The method of claim 4, further comprising:
    attempting to decode, according to the determined set of control channel candidates, a control signal for the at least one available subband during the transmission opportunity, the received at least one downlink signal comprising the control signal.

9. The method of claim 8, wherein attempting to decode the control signal comprises:
    identifying a first search space set and a second search space set in the identified plurality of search space sets;
    determining whether a first number of control channel candidates of the first search space set exceeds a blind decoding threshold;
    determining, based at least in part on the first search space set exceeding the blind decoding threshold, whether a second number of control channel candidates of the second search space set exceeds the blind decoding threshold; and attempting to decode the control signal according to the second search space set based at least in part on the second search space set not exceeding the blind decoding threshold.

10. The method of claim 8, wherein attempting to decode the control signal comprises:

attempting to decode the control signal according to the search space set and the identified offset.

11. The method of claim 8, wherein attempting to decode the control signal comprises:

attempting to decode the control signal according to one or more of the identified plurality of search space sets, at least one of the plurality of search space sets comprising a UE specific search space set.

12. The method of claim 1, wherein receiving the indication of the at least one available subband comprises:

receiving, in the at least one available subband, a control channel conveying the indication of the at least one available subband.

13. The method of claim 12, wherein the control channel is a common control channel shared by a plurality of UEs.

14. The method of claim 1, wherein determining the set of time-frequency resources of the at least one available subband for the at least one downlink signal comprises:

identifying an intersection of the plurality of time-frequency resources indicated by the received resource configuration and the subset of the set of frequency resources; and determining, based at least in part on the identified intersection, the set of time-frequency resources within the at least one available subband for the at least one downlink signal.

15. The method of claim 1, wherein the received resource configuration comprises a semi persistent scheduling (SPS) configuration, the SPS configuration indicating a first transport block size different from a transport block size associated with the at least one downlink signal received by the UE according to the determined set of time-frequency resources.

16. The method of claim 1, wherein the received resource configuration comprises a semi persistent scheduling (SPS) configuration, wherein the at least one downlink signal is encoded using a same modulation and coding scheme as indicated by the SPS configuration.

17. A method for wireless communication at a base station, comprising:

identifying a bandwidth part configuration for a UE, the bandwidth part configuration indicating a set of frequency resources of a shared radio frequency (RF) spectrum band;

transmitting, to the UE, a resource configuration for a bandwidth part, the resource configuration indicating a plurality of subbands for the bandwidth part, at least one guard band between a first subband of the plurality of subbands and a second subband of the plurality of subbands, and a plurality of time-frequency resources;

transmitting, during a transmission opportunity, an indication of at least one available subband of the plurality of subbands for the transmission opportunity, the at least one available subband comprising a subset of the set of frequency resources, wherein the subset of the set of frequency resources comprises the first subband, the second subband, or any combination thereof;

determining, based at least in part on the transmitted resource configuration for the bandwidth part and the transmitted indication of the at least one available subband, a set of time-frequency resources of the at least one available subband for at least one downlink signal, wherein the plurality of time-frequency resources comprise the set of time-frequency resources;

identifying a plurality of search space sets for the at least one available subband, each of the plurality of search space sets associated with an index value;

identifying an offset for a search space set of the plurality of search space sets based at least in part on the index value associated with the search space set; and transmitting, during the transmission opportunity, the at least one downlink signal according to the determined set of time-frequency resources, the identified plurality of search space sets, and the identified offset.

18. The method of claim 17, wherein the resource configuration comprises a reference signal configuration for the bandwidth part, and wherein determining the set of time-frequency resources of the at least one available subband comprises:

determining, based at least in part on the transmitted reference signal configuration and the transmitted indication, resources of the at least one available subband to use to transmit reference signals during the transmission opportunity.

19. The method of claim 17, wherein the resource configuration comprises a semi-persistent scheduling configuration for the bandwidth part, and wherein determining the set of time-frequency resources of the at least one available subband comprises:

determining, based at least in part on the transmitted semi-persistent scheduling configuration and the transmitted indication, resources within the at least one available subband to use to transmit downlink data for the UE during the transmission opportunity.

20. The method of claim 17, wherein the resource configuration comprises a control resource set configuration for the bandwidth part, and wherein determining the set of time-frequency resources of the at least one available subband comprises:

determining, based at least in part on the transmitted control resource set configuration and the transmitted indication, a set of control channel candidates to be used by the UE for the at least one available subband during the transmission opportunity.

21. The method of claim 20, wherein determining the set of control channel candidates for the at least one available subband comprises:

identifying, for the bandwidth part, a plurality of control channel candidates indicated by the control resource set configuration; and determining the set of control channel candidates based at least in part on at least one of the identified plurality of control channel candidates being within the at least one available subband.

22. The method of claim 21, wherein determining the set of control channel candidates further comprises:

identifying a control channel candidate for which at least a portion is outside the at least one available subband; and dropping the identified control channel candidate.

23. The method of claim 20, wherein determining the set of control channel candidates for the at least one available subband comprises:

identifying an intersection of a reference control resource set indicated by the received control resource set configuration and the at least one available subband;

determining a control resource set for the at least one available subband from the identified intersection; and determining, based at least in part on the determined control resource set, the set of control channel candidates for the at least one available subband.

24. The method of claim 17, wherein transmitting the indication of the at least one available subband comprises:
transmitting, in the at least one available subband, a control channel conveying the indication of the at least one available subband.

25. The method of claim 24, wherein the control channel is a common control channel shared by a plurality of UEs.

26. The method of claim 17, wherein determining the set of time-frequency resources of the at least one available subband for the at least one downlink signal comprises:
identifying an intersection of the plurality of time-frequency resources indicated by the transmitted resource configuration and the subset of the set of frequency resources; and
determining, based at least in part on the identified intersection, the set of time-frequency resources within the at least one available subband for the at least one downlink signal.

27. The method of claim 17, wherein the transmitted resource configuration comprises a semi persistent scheduling (SPS) configuration, the SPS configuration indicating a first transport block size different from a transport block size associated with the at least one downlink signal received by the UE according to the determined set of time-frequency resources.

28. The method of claim 17, wherein the transmitted resource configuration comprises a semi persistent scheduling (SPS) configuration, wherein the at least one downlink signal is encoded using a same modulation and coding scheme as indicated by the SPS configuration.

29. An apparatus for wireless communication at a user equipment (UE), comprising:
a processor,
memory coupled with the processor; and
instructions stored in the memory and executable by the processor to cause the apparatus to:
identify a bandwidth part configuration for the UE, the bandwidth part configuration indicating a set of frequency resources of a shared radio frequency (RF) spectrum band;
receive a resource configuration for a bandwidth part, the resource configuration indicating a plurality of subbands for the bandwidth part, at least one guard band between a first subband of the plurality of subbands and a second subband of the plurality of subbands, and a plurality of time-frequency resources;
receive, during a transmission opportunity, an indication of at least one available subband of the plurality of subbands for the transmission opportunity, the at least one available subband comprising a subset of the set of frequency resources, wherein the subset of the set of frequency resources comprises the first subband, the second subband, or any combination thereof;
determine, based at least in part on the received resource configuration for the bandwidth part and the received indication of the at least one available subband, a set of time-frequency resources of the at least one available subband for at least one downlink signal, wherein the plurality of time-frequency resources comprise the set of time-frequency resources;
identify a plurality of search space sets for the at least one available subband, each of the plurality of search space sets associated with an index value;
identify an offset for a search space set of the plurality of search space sets based at least in part on the index value associated with the search space set; and
receive, during the transmission opportunity, the at least one downlink signal according to the determined set of time-frequency resources, the identified plurality of search space sets, and the identified offset.

30. An apparatus for wireless communication at a base station, comprising:
a processor,
memory coupled with the processor; and
instructions stored in the memory and executable by the processor to cause the apparatus to:
identify a bandwidth part configuration for a UE, the bandwidth part configuration indicating a set of frequency resources of a shared radio frequency (RF) spectrum band;
transmit, to the UE, a resource configuration for a bandwidth part, the resource configuration indicating a plurality of subbands for the bandwidth part, at least one guard band between a first subband of the plurality of subbands and a second subband of the plurality of subbands, and a plurality of time-frequency resources;
transmit, during a transmission opportunity, an indication of at least one available subband of the plurality of subbands for the transmission opportunity, the at least one available subband comprising a subset of the set of frequency resources, wherein the subset of the set of frequency resources comprises the first subband, the second subband, or any combination thereof;
determine, based at least in part on the transmitted resource configuration for the bandwidth part and the transmitted indication of the at least one available subband, a set of time-frequency resources of the at least one available subband for at least one downlink signal, wherein the plurality of time-frequency resources comprise the set of time-frequency resources;
identify a plurality of search space sets for the at least one available subband, each of the plurality of search space sets associated with an index value;
identify an offset for a search space set of the plurality of search space sets based at least in part on the index value associated with the search space set; and
transmit, during the transmission opportunity, the at least one downlink signal according to the determined set of time-frequency resources, the identified plurality of search space sets, and the identified offset.

* * * * *